(12) United States Patent
Gaudette

(10) Patent No.: US 9,187,264 B2
(45) Date of Patent: Nov. 17, 2015

(54) APPARATUS, SYSTEMS AND METHODS FOR SECURING, LOADING AND UNLOADING PARTS USING LOCKING DUNNAGE

(75) Inventor: Jeffrey D. Gaudette, Windsor (CA)

(73) Assignee: Jeffrey Douglas Gaudette, Windsor Ontario (CA)

( * ) Notice: Subject to any disclaimer, the term of this patent is extended or adjusted under 35 U.S.C. 154(b) by 435 days.

(21) Appl. No.: 13/203,790

(22) PCT Filed: Mar. 1, 2010

(86) PCT No.: PCT/CA2010/000294
§ 371 (c)(1),
(2), (4) Date: Dec. 8, 2011

(87) PCT Pub. No.: WO2010/096937
PCT Pub. Date: Sep. 2, 2010

(65) Prior Publication Data
US 2013/0004289 A1    Jan. 3, 2013

Related U.S. Application Data

(60) Provisional application No. 61/156,084, filed on Feb. 27, 2009.

(51) Int. Cl.
*B65B 21/02* (2006.01)
*B65G 47/90* (2006.01)
*B65G 61/00* (2006.01)

(52) U.S. Cl.
CPC .............. *B65G 47/904* (2013.01); *B65G 61/00* (2013.01)

(58) Field of Classification Search
CPC .......................................... B65H 29/00
USPC ............... 414/331.1, 331.12, 331.15, 331.18, 414/416.01, 416.05, 416.08, 811
See application file for complete search history.

(56) References Cited

U.S. PATENT DOCUMENTS

| | | |
|---|---|---|
| 2,946,453 A | 7/1960 | Pityo |
| 3,822,783 A | 7/1974 | Mortensen |

(Continued)

FOREIGN PATENT DOCUMENTS

| | | |
|---|---|---|
| DE | 202006001933 | 5/2006 |
| FR | 2811252 | 11/2002 |
| GB | 2033462 | 5/1980 |

OTHER PUBLICATIONS

PCT International Search Report for PCT Application No. PCT/CA2009/000796, mailed Oct. 1, 2009.

(Continued)

*Primary Examiner* — Dean Kramer
*Assistant Examiner* — Willie Berry, Jr.
(74) *Attorney, Agent, or Firm* — Bereskin & Parr LLP

(57) ABSTRACT

A system for and method of unloading parts includes a rack and at least a first part held in a first position within the rack. At least one rack robot picks up the rack and moves the rack to a first orientation so as to position and orient the first part in a removal locus for removal from the rack. At least one line side robot removes the first part from the rack at the removal locus. The rack robot may move the rack to a second orientation so as to position and orient a second part in the removal locus for removal by the line side robot. The rack may include a plurality of clips moveable between a locked position in which the clip can securely hold a part, and an open position in which a part can be inserted or removed from the clip.

7 Claims, 18 Drawing Sheets

(56) References Cited

U.S. PATENT DOCUMENTS

| | | |
|---|---|---|
| 4,411,361 A | 10/1983 | Mentzer |
| 4,647,269 A | 3/1987 | Wedel et al. |
| 4,773,523 A | 9/1988 | Hansen, Jr. et al. |
| 5,141,114 A | 8/1992 | Cate et al. |
| 5,267,652 A | 12/1993 | Carroll |
| 5,339,958 A | 8/1994 | Taravella et al. |
| 5,413,216 A | 5/1995 | Timmins |
| 5,582,495 A | 12/1996 | Schroder |
| 5,598,924 A | 2/1997 | McCann |
| 5,876,165 A | 3/1999 | Campbell |
| 6,315,121 B1 | 11/2001 | Hansen |
| 6,394,721 B1 | 5/2002 | Campbell |
| 6,550,623 B2 | 4/2003 | Cook et al. |
| 6,579,053 B1 | 6/2003 | Grams et al. |
| 6,598,756 B1 | 7/2003 | Rosenfeldt |
| 6,786,687 B1 | 9/2004 | Schroeder |
| 7,001,130 B2 | 2/2006 | Ransom |
| 7,128,509 B2 | 10/2006 | Farley et al. |
| 7,237,993 B2 | 7/2007 | Farley et al. |
| 7,321,807 B2 | 1/2008 | Laski |
| 8,308,408 B2 | 11/2012 | Gaudette |
| 2005/0126952 A1 | 6/2005 | Kaltz et al. |
| 2008/0035513 A1 | 2/2008 | Farley et al. |
| 2008/0187412 A1 | 8/2008 | Sturm et al. |

OTHER PUBLICATIONS

PCT Written Opinion for PCT Application No. PCT/CA2009/000796, mailed Oct. 1, 2009.

Canadian Office Action for CA Patent Application No. 2,690,120, mailed Apr. 1, 2010.

Extended European Search Report, Aug. 10, 2012 for corresponding European Patent Application Serial No. 09761202.2.

Response to Extended European Search Report dated Mar. 7, 2013 for corresponding European Patent Application Serial No. 09761202.2.

PCT Written Opinion for PCT Application No. PCT/CA2020/000294, mailed Jun. 23, 2010.

PCT International Search Report for PCT Application No. PCT/CA2010/000294, mailed Jun. 23, 2010.

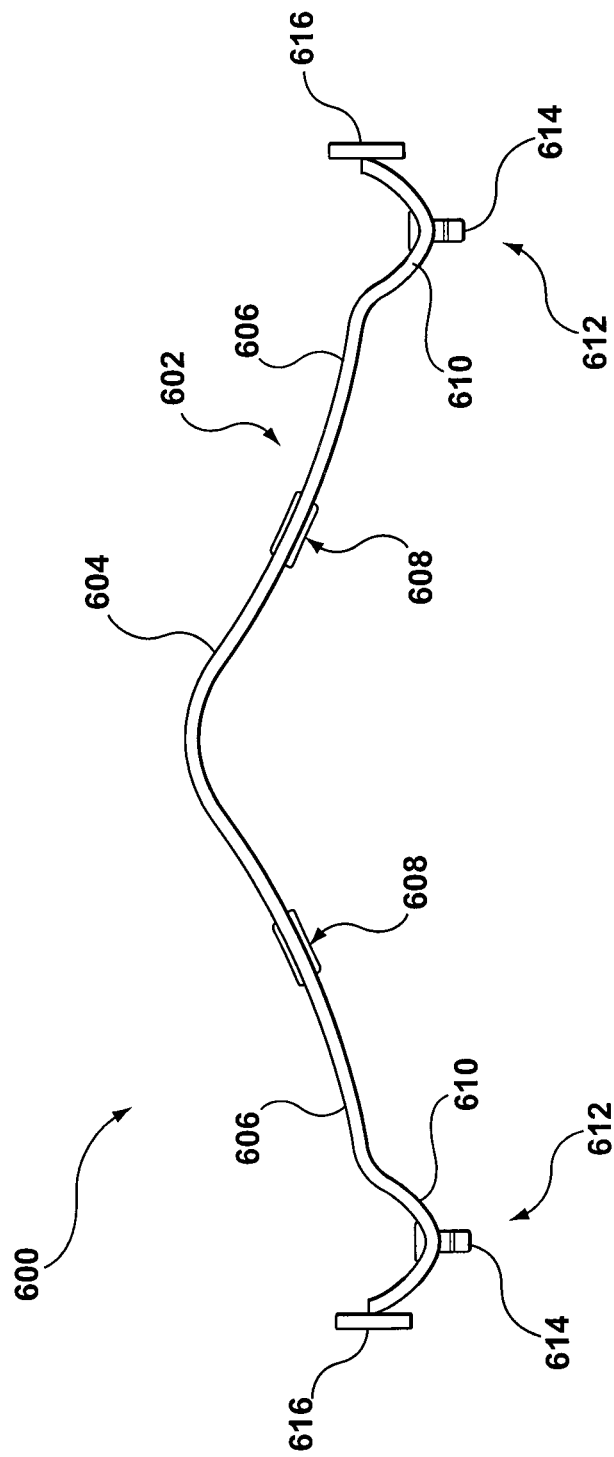

APPARATUS, SYSTEMS AND METHODS FOR SECURING, LOADING AND UNLOADING PARTS USING LOCKING DUNNAGE

RELATED APPLICATION

This application claims priority to U.S. Provisional Patent Application No. 61/156,084, filed on Feb. 27, 2009 and entitled APPARATUS, SYSTEMS AND METHODS FOR SECURING, LOADING AND UNLOADING PARTS USING LOCKING DUNNAGE, the entire contents of which are hereby incorporated by reference.

TECHNICAL FIELD

This specification relates to transporting parts, and in particular to apparatus, systems and methods for securing, loading and unloading parts using locking dunnage.

BACKGROUND

In many industries, dunnage is used to pack, support, and protect parts when transporting the parts. For example, in the automotive industry, manufacturers often ship their parts in large rectangular racks, with a number of parts supported within the rack by one or more dunnage strips.

Throughout the manufacturing chain, the parts may be loaded and unloaded from the racks as needed. The arrangement and number of parts per rack is often limited by how the parts may be loaded and unloaded from the racks, and normally not all of the available space is used. For example, conventional dunnage strips may have spaced apart slots and rely on gravity to hold the part within the slot, and may limit the packing density (e.g. number of parts that fit in a given rack). Furthermore, conventional assembly lines may use a robot to remove the parts from the rack, and the robot may not be able to properly locate each part within a rack when using conventional dunnage systems.

Accordingly, there is a need for improved apparatus, systems and methods for securing parts and for loading and unloading secured parts.

SUMMARY

In an aspect of this specification, a system for unloading parts comprises: a rack; at least a first part held in a first position within the rack; and at least one rack robot configured to pick up the rack and move the rack to a first orientation so as to position and orient the first part in a removal locus for removal from the rack.

A second part may be held in a second position within the rack so that the second part may be removed from the rack after removing the first part from the rack. The rack robot may be configured to move the rack to a second orientation so as to position and orient the second part in the removal locus for removal from the rack.

The system may further comprise at least one line side robot configured to remove the first part from the rack at the removal locus. The line side robot may be configured to remove the second part from the rack at the removal locus.

The system may further comprise a line feed device for conveying the rack to the rack robot. The line feed device may be configured to present the rack to the rack robot in a normal orientation.

The rack robot may comprise: a base; at least one arm extending generally upwardly from the base and pivotally coupled thereto; and an adjustable fixture attached to a distal end of the at least one arm and configured to pick up the rack and move the rack to the first and second orientations.

The line side robot may comprise: a base; at least one arm extending generally upwardly from the base and pivotally coupled thereto; and a picking element attached to a distal end of the at least one arm and configured to remove the first and second parts from the rack. The line side robot may further comprise a sensor for sensing position and orientation of the first part. The line side robot may be configured to communicate with the rack robot so as to correct the position and orientation of the first part by moving the rack.

The rack may comprise: a frame; and a plurality of clips coupled to the frame, each of the clips moveable between a locked position in which the clip can securely hold a part, and an open position in which a part can be inserted or removed from the clip, each of the first and second parts being held by at least one of the clips.

The rack may comprise: a frame; and at least one dunnage strip coupled to the frame, the at least one dunnage strip including an elongate body and having plurality of clips attached along the body, each of the clips moveable between a locked position in which the clip can securely hold a part, and an open position in which a part can be inserted or removed from the clip, each of the first and second parts being held by at least one of the clips.

The line side robot may be configured to move the at least one clip holding the first part to the open position to remove the first part from the rack. The line side robot may be configured to move the at least one clip holding the second part to the open position to remove the second part from the rack.

Each of the clips may comprise: a body portion having a first wall surface and a supporting surface adjacent the first wall surface; and a retaining arm connected to the body, the retaining arm comprising a second wall surface opposite the first wall surface, an engaging portion at the distal end of the retaining arm, and an engaging surface on the engaging portion generally opposite the supporting surface, the first and second wall surfaces cooperate to define a groove that is sized and shaped to receive a portion of the first or second part therein, and the retaining arm is moveable between the open position in which the portion of the first or second part may be received in the groove, and the locked position in which the engaging surface at least partially overhangs the groove and the engaging surface and the supporting surface cooperate so as to retain the portion of the first or second part when received within the groove.

Each of the clips may further comprise at least one locking tab extending outwardly from the engaging surface. Each locking tab may have a width that is substantially less than a width of the retaining arm. Each of the first and second parts may be suspended generally below the respective clips.

In an aspect of this specification, a method of unloading parts comprises: (a) providing a rack having at least a first part held in a first position within the rack; (b) picking up the rack; (c) moving the rack to a first orientation so that the first part is in a removal locus; and (d) removing the first part from the rack.

The rack may have a second part held in a second position within the rack, and, after step (d), the second part is removed from the rack. The method may further comprise, after step (d) and prior to removing the second part from the rack, moving the rack to a second orientation so that the second part is in the removal locus.

Step (a) may comprise receiving the rack conveyed by a line feed device. Prior to step (b), the line feed device may present the rack in a normal orientation. After removing the first and second parts, the rack may be conveyed away by the line feed device.

Steps (b) and (c) may be carried out using at least one rack robot. Step (d) may be carried out using at least one line side robot.

A plurality of clips may be coupled to the rack, each of the clips moveable between a locked position in which the clip can securely hold a part, and an open position in which a part can be inserted or removed from the clip, each of the first and second parts being held by at least one of the clips, and, in step (d), the line side robot may move the at least one clip holding the first part to the open position. In removing the second part from the rack, the line side robot may move the at least one clip holding the second part to the open position.

The method may further comprise, prior to step (d), sensing position and orientation of the first part. The method may further comprise communicating with the rack robot so as to correct the position and orientation of the first part by moving the rack.

In an aspect of this specification, a rail assembly comprises: two or more elongate rails arranged generally in parallel; at least one cross member securing the rails together; and a plurality of clips for securing parts coupled to an underside of each of the rails, each of the clips moveable between a locked position in which the clip can securely hold a part, and an open position in which a part can be inserted or removed from the clip.

Each of the rails may comprise a plurality of apertures for suspending and manipulating the rail assembly generally from above. The rail assembly may further comprise a plurality of dunnage strips coupling the plurality of clips with the rails.

The rail assembly may be combined with a lower rack body, wherein the rail assembly is removably supported by the lower rack body.

At least one rail assembly may be combined with a transportation container, wherein the at least one rail assembly is removably supported within the transportation container. Two or more of the rail assemblies may be stacked generally vertically within the transportation container. The two or more of the rail assemblies may be coupled by a scissoring device.

In an aspect of this specification, a rack for securing parts comprises: a frame; and a plurality of clips coupled to the frame, each of the clips moveable between a locked position in which the clip can securely hold a part and an open position in which a part can be inserted or removed from the clip, wherein a first part is held within the frame in a first position using at least a first clip, and the second part is held within the frame in a second position using at least a second clip, and wherein positions and orientations of the first and second clips are selected to optimize packing density of the first and second parts within the rack. The first part may be a right-hand part and the second part may be a left-hand part, and the second part is generally inverted in orientation relative to the first part within the frame.

In an aspect of this specification, a device for securing parts comprises: a main body portion; and at least one dunnage strip coupled to the main body portion, the dunnage strip configured to secure parts suspended below the main body portion.

The main body portion may comprise an inner region and outer regions on generally opposing sides of the inner region. The inner region of the main body portion may comprise a plurality of apertures for picking up the device. Each of the outer regions may comprise a plurality of wheels coupled thereto for engagement with guide rails.

There may be at least one of the dunnage strips coupled to each of the outer regions. A plurality of clips may be attached along each of the dunnage strips, each of the clips moveable between a locked position in which the clip can securely hold a part and an open position in which a part can be inserted or removed from the clip. Each of the clips may comprise: a body portion having a first wall surface and a supporting surface adjacent the first wall surface; and a retaining arm connected to the body, the retaining arm comprising a second wall surface opposite the first wall surface, an engaging portion at the distal end of the retaining arm, and an engaging surface on the engaging portion generally opposite the supporting surface, the first and second wall surfaces cooperate to define a groove that is sized and shaped to receive a portion of a part therein, and the retaining arm is moveable between the open position in which the portion of the part may be received in the groove, and the locked position in which the engaging surface at least partially overhangs the groove and the engaging surface and the supporting surface cooperate so as to retain the portion of the part when received within the groove.

BRIEF DESCRIPTION OF THE DRAWINGS

The drawings included herewith are for illustrating various examples of systems, methods, and apparatuses of the present specification and are not intended to limit the scope of what is taught in any way. In the drawings:

FIG. 22 is an end view of the device of FIG. 19.

DETAILED DESCRIPTION

Figure 1:
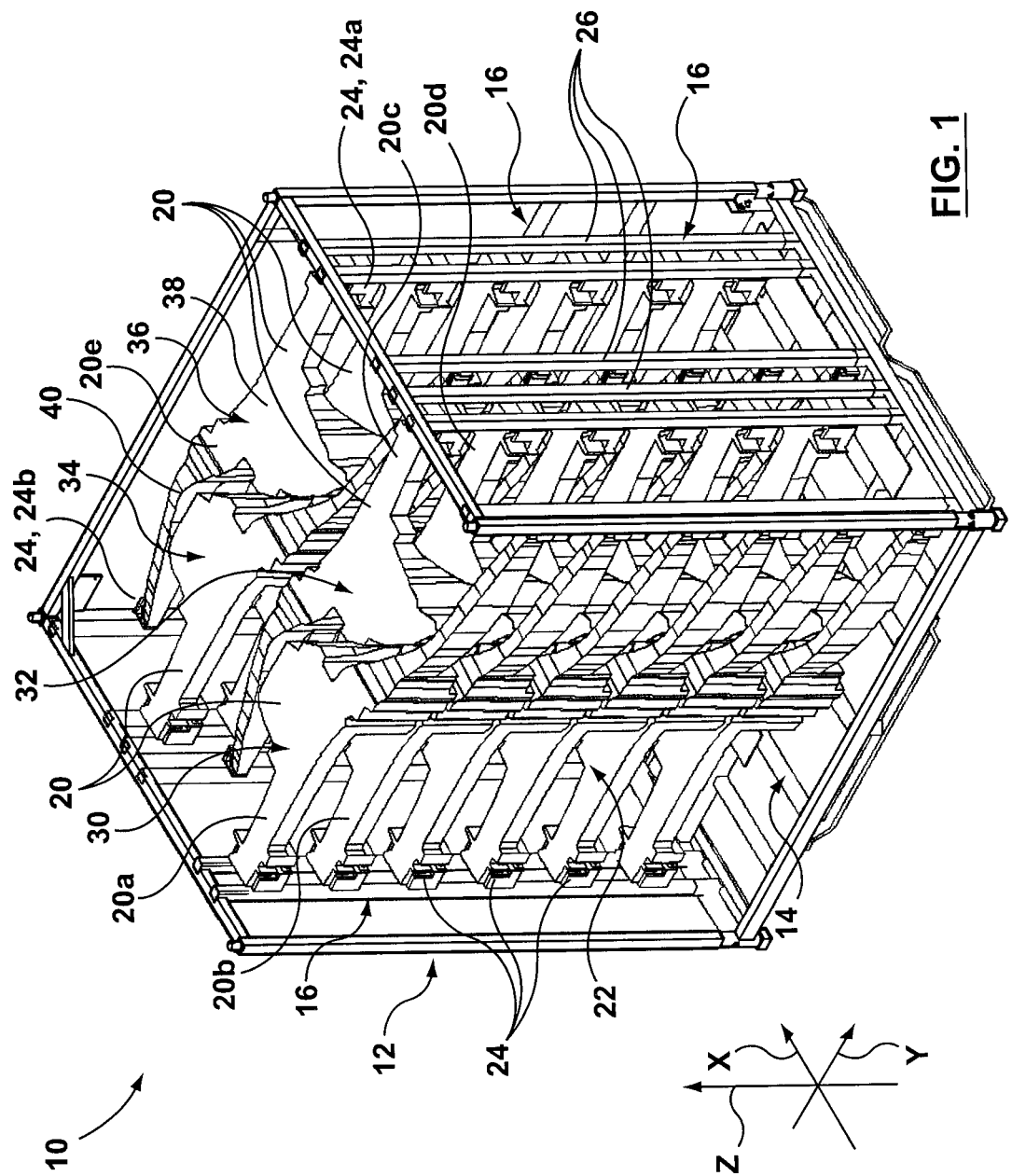
FIG. 1 is a perspective view of a rack having a plurality of clips for holding parts within the rack.

Referring to FIG. 1, an example of a rack for securing parts is shown generally at 10. The rack 10 includes a frame 12 having a rectangular base 14 extending along a plane parallel to a longitudinal axis X and a transverse axis Y, and three sidewalls 16 extending upwardly from the base 14 along a vertical axis Z. The base 14 and sidewalls 16 are formed by a plurality of structural members so as to generally define an open compartment for receiving and storing parts 20. One side of the frame 12 may define an opening 22 so that parts 20 may be loaded or unloaded from the rack 10. The top of the rack 10 may also be open to facilitate loading and unloading of parts.

The rack 10 includes a plurality of clips 24 coupled to the frame 12. The clips 24 are generally configured to hold one or more parts 20 securely within the rack 10, and each clip 24 is moveable between a locked position (in which the clip 24 holds the part 20) and an open position (in which the part 20 can be inserted or removed from the clip 24).

The clips 24 may be similar to the clips as generally described in PCT International Publication No. WO 2009/149544, filed on Jun. 11, 2009 and entitled APPARATUS, SYSTEMS AND METHODS FOR SECURING PARTS, the entire contents of which are hereby incorporated by reference.

As shown, the clips 24 may be coupled to the frame 12 in columns as dunnage strips 26. Generally, the dunnage strips 26 are elongate bars having connection points for securing the clips 24 thereto. In some embodiments, the dunnage strips 26 may have connection points at various positions along a main body thereof so that the clips 24 may be attached at different locations along the length of the dunnage strip 26. The dunnage strip 26 may have a different number of clips 24. As shown, each dunnage strip 26 can have six clips 24.

In other embodiments, the clips 24 may be attached directly to the frame 12 without the use of dunnage strips 26.

As shown, each part 20 may be held on the frame 12 using one or more clips 24. For example, the part indicated by numeral 20e is supported by two clips 24a, 24b. Each of the two clips 24a, 24b may be connected to a different dunnage strip 26. Generally, the number and locations of clips 24 used to support each part 20 may be selected so as to securely hold the part 20 within the rack 10.

In the illustrated example, the parts 20 loaded in the rack 10 are arranged in four stacks of parts: a front left stack 30, a front right stack 32, a rear left stack 34, and a rear right stack 36. It will be appreciated that this is merely an example of one arrangement of parts 20 within the rack 10.

The parts in each stack 30, 32, 34 and 36 may have the same orientation and be stacked one on top of another along the vertical axis Z. In particular, the front left stack 30 has a first part 20a in a first position and first orientation, and a second part 20b in a second position below the first position and a second orientation generally similar to the first orientation. The front right stack 32 has a third part 20c in a third position and third orientation, and a fourth part 20d in a fourth position and fourth orientation. The fourth position is below the third position, and the fourth orientation is generally the same as the third orientation.

The parts within the rear left stack 34 in this example are generally oriented the same way as the front left stack 30, and the parts within the rear right stack 36 are generally oriented the same way as the front right stack 32.

In comparison to the parts in the front left stack 30, the parts in the front right stack 32 are provided in an orientation rotated 180 degrees about the vertical axis Z. This orientation may increase the packing density of the parts within the rack 10.

Generally, the orientation of the parts is selected based on the shape of each part. For example, referring specifically to the part 20e, each part 20 has a wide portion 38 and a narrow portion 40. Due to the 180-degree rotation of the third part 20c relative to the first part 20a, the wide portion of the first part 20a in the front left stack 30 is adjacent to the narrow portion of the third part 20c in the front right stack 32. As such, the outer contours of each part may generally follow the outer contours of the adjacent parts so as to reduce or minimize the amount of unoccupied space between adjacent parts. Accordingly, the arrangement may be selected to reduce or minimize the space between parts 20 and thus increase the packing density within the rack 10.

This may be particularly desirable in the automotive industry where parts 20 are shipped in transport trucks or other containers. If the parts 20 can be packed more tightly in a given truck, the number of trucks and overall transportation costs may be reduced.

It will be appreciated that in other embodiments, the parts 20 may have different positions and orientations within the rack 10 as compared to the illustrated example. For example, the parts 20 may have different shapes, and may have different positions and/or orientations within the rack 10 to increase the packing density within the rack 10. In some example, the parts 20 may be positioned in an arrayed arrangement within the rack 10.

In some embodiments, each part 20 may be rotated at different angles relative to the longitudinal axis X, the transverse axis Y, and/or the vertical axis Z relative to another part within the rack 10. For example, the parts 20c, 20d in the front right stack 32 may be flipped upside-down relative to the parts 20a, 20b in the front left stack 30. In other embodiments, the parts 20 may also be arranged in stacks along a different axis other than the vertical axis Z. For example, the parts may be stacked along the longitudinal axis X, the transverse axis Y, or an axis inclined relative to either of those axes. In some embodiments, the parts may not be arranged in stacks at all, but may be positioned and oriented at various locations throughout the rack 10.

Figure 2:
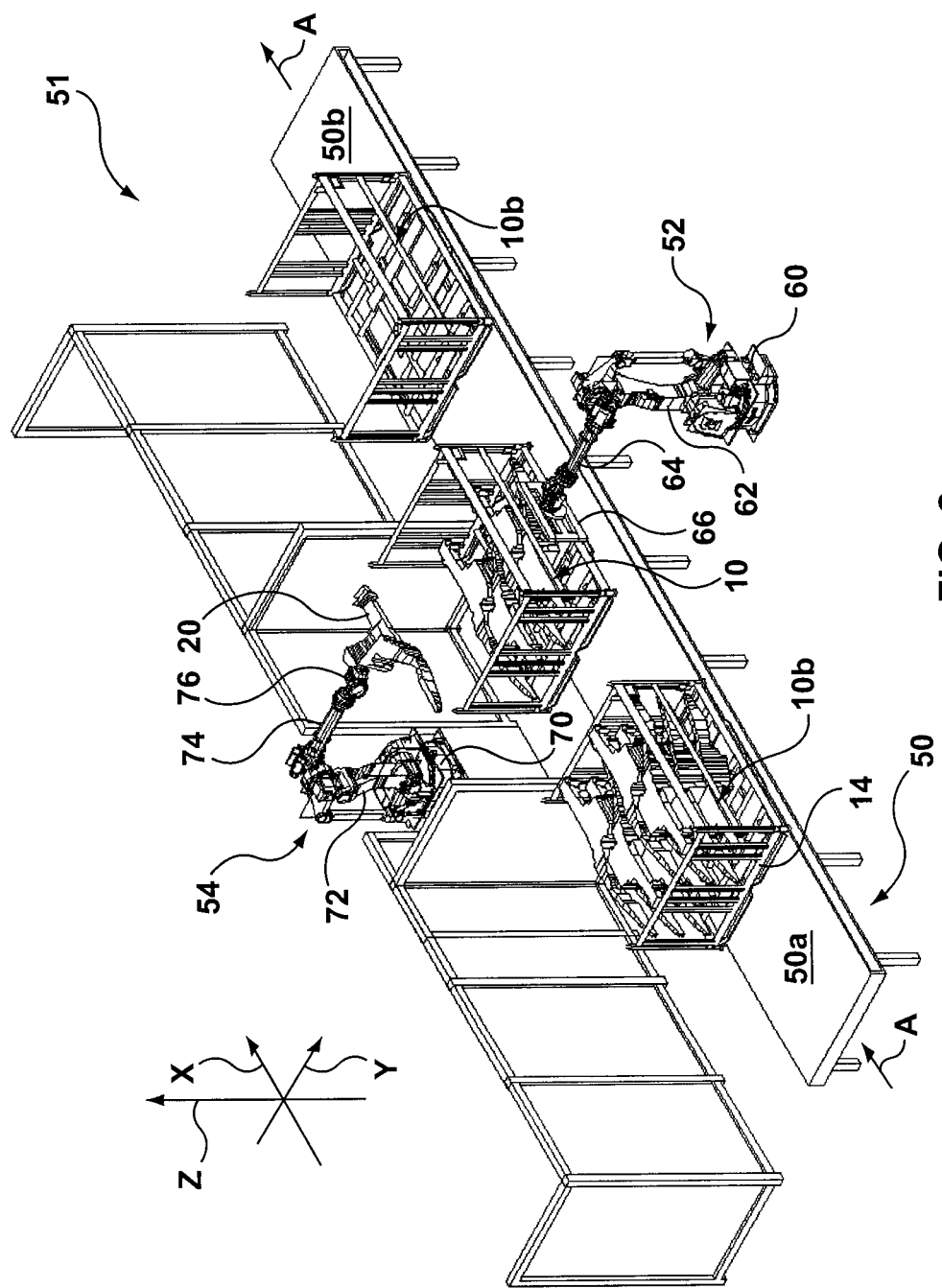
FIG. 2 is a perspective view of a system for unloading parts from a rack including a line feed device, a rack robot, and a line side robot.
Figure 3:
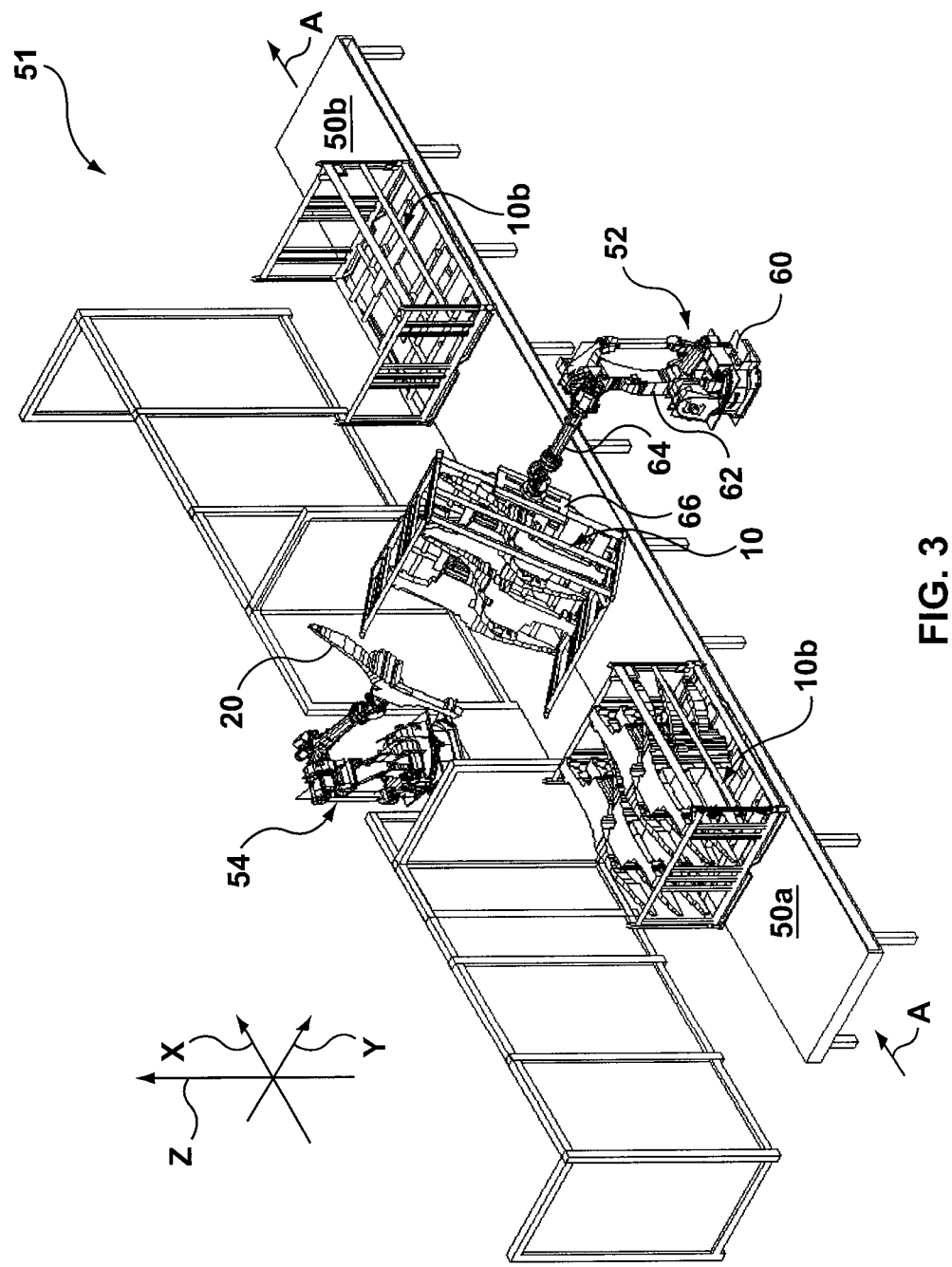
FIG. 3 is a perspective view of the system shown in FIG. 2 where the rack robot has reoriented the rack.

The parts 20 can be loaded onto and unloaded from the rack 10 as desired. Referring to FIG. 2, an example of a system for loading and/or unloading the parts 20 from the rack 10 is shown generally at 51. As shown, the system 51 may include a line feed device 50 for conveying racks 10 (e.g. from a transportation device such as a truck or container), at least one rack robot 52 for picking up the racks 10 from the line feed device 50, and at least one line side robot 54 for removing parts 20 from the rack 10.

The term "robot", as used herein, refers generally to a controlled, electromechanical manipulator that is programmable in three or more axes. Robots may include a single mechanical manipulator arm, or two or more coordinated mechanical manipulator arms. Robots may include their own control system, or "brain", or may be connected by wire or wirelessly to a central control system. A central control system may be operably connected to a plurality of robots and coordinate the action of each. Robots include an end effector suitable for manipulating a rack or a part, for example but not limited to, electromechanical or pneumatic grippers, vacuums, magnets, etc.

The operation of the system 51 will now be described with reference to the unloading of a rack 10.

During unloading, the line feed device 50 generally conveys loaded racks 10a from an input end 50a to an output end 50b along a feed direction indicated by the arrow A. At the input end 50a, the loaded racks 10a include one or more parts 20 therein. The loaded racks 10a move towards and are engaged by the rack robot 52. The line side robot 54 then unloads parts 20 from the rack 10, typically until the rack 10 is empty. Then, empty racks 10b leave the system at the output end 50b.

As shown, the line feed device 50 can be a conveyor belt. In other embodiments, the line feed device 50 can be another type of feed device, such as a roller conveyor, a jitney, an automatic guided vehicle (AGV), a manual feed device, or any other suitable device. Furthermore, the system 51 may be provided without a line feed device 50, for example where the rack robot 52 is able to pull racks 10 directly from a transportation container.

Generally, the loaded racks 10a may enter the input end 50a in a normal orientation, such that one side of the loaded rack 10a rests on the top surface of the line feed device 50. In the illustrated example, the base 14 of the loaded rack 10a rests against the top surface of the line feed device 50. Similarly, the empty racks 10b may leave the output end 50b in the same normal orientation.

However, in some examples, the rack robot 52 may be configured to receive the rack 10 in a non-normal orientation. For example, if the parts 20 are positioned in an arrayed arrangement within the rack 10, a flexible delivery means (e.g. the line feed device 50 includes an AGV or other robotic delivery mechanism) may be desirable to accommodate "out of normal" positioning. The rack robot 52 may be flexibly configured to engage and manipulate the rack 10 in various orientations and is not necessarily limited to receiving the rack in the normal orientation.

With reference now to FIGS. 2 to 5, the rack robot 52 generally includes a base 60 having an axis of rotation parallel to the vertical axis Z. In some examples, the base 60 can be mounted to a ground surface, a wall surface, or a ceiling surface. In other examples, the base 60 can be moveable, including drive wheels or other means for transporting the rack robot 52, or the base 60 can be mounted onto a gantry with a predetermined path of travel along the ground or above. The base 60 supports a lower arm 62 that extends generally upward from the base 60 from a proximal end to a distal end. The proximal end of the lower arm 62 is pivotally coupled to the base 60 so that the lower arm 62 may pivot about the base 60, for example generally about the longitudinal axis X. The distal end of the lower arm 62 is pivotally coupled to an upper arm 64.

The upper arm 64 extends from a proximal end to a distal end. The proximal end of the upper arm 64 is pivotally coupled to the distal end of the lower arm 62 so that the upper arm 64 may pivot about the lower arm 62, for example generally about longitudinal axis X. Furthermore, the upper arm 64 may be configured to rotate generally about the transverse axis Y. In some embodiments, the rack robot 52 may have other arms or axes of rotation that allow further mobility. For example, the rack robot 52 may be a six-axis robot or a seven-axis robot.

The rack robot 52 may also include an end effector in the form of an adjustable fixture 66 attached to the distal end of the upper arm 64. Generally, the adjustable fixture 66 allows the rack robot 52 to securely grab the racks 10 from the line feed device 50 so that the racks 10 can be picked up and moved.

Figure 5:
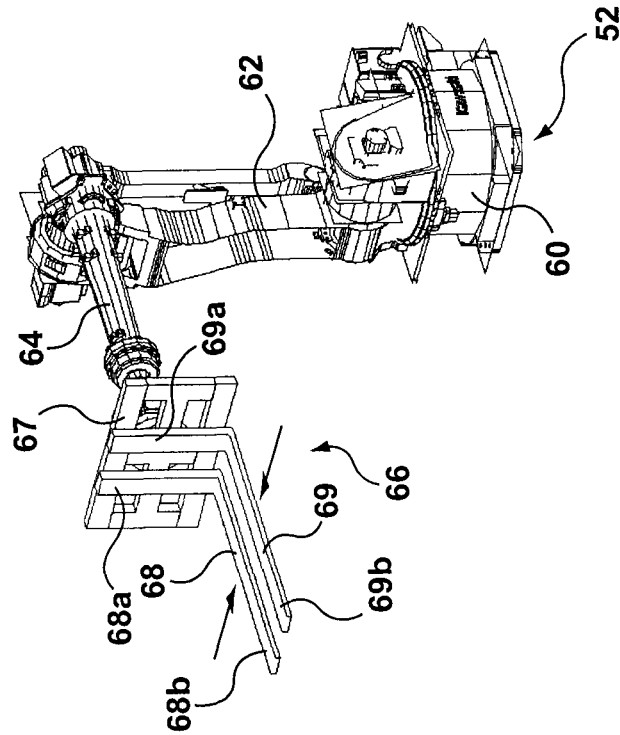
FIG. 5 is a perspective view of the rack robot of FIG. 5 where the adjustable fixture has been adjusted.
Figure 4:
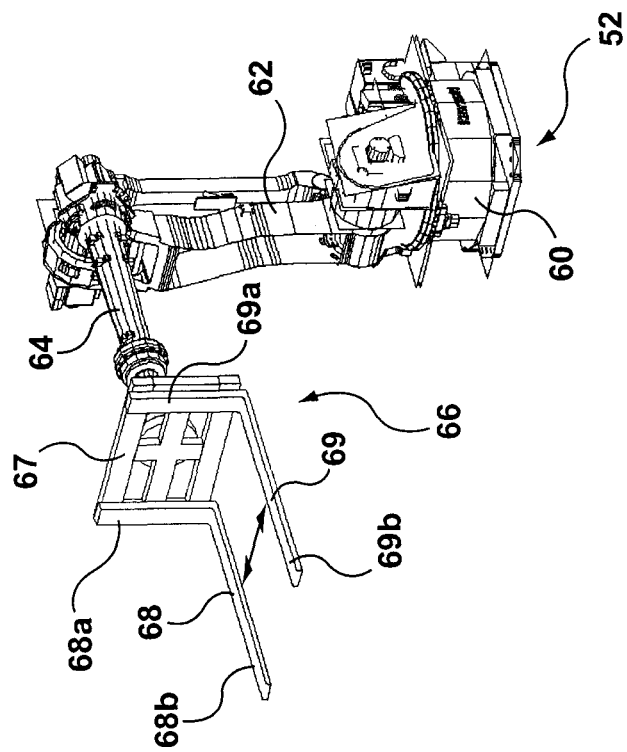
FIG. 4 is a perspective view of a rack robot having an adjustable fixture for moving racks.

For example, referring to FIGS. 4 and 5, the adjustable fixture 66 may include a support bracket 67 having two forks 68, 69 moveable along a width of the support bracket 67. For example, as shown in FIG. 4, the forks 68, 69 are positioned towards sides of the support bracket 67. In FIG. 5, the forks 68, 69 are positioned towards a center of the support bracket 67.

The forks 68, 69 may be generally L-shaped, having vertical portions 68a, 69a slidably attached to the support bracket 67 for repositioning the forks 68, 69 along the width of the support bracket 67, and horizontal portions 68b, 69b extending outward from the support bracket 67 for supporting the rack 10. The forks 68, 69 may be repositioned along the width of the support bracket 67 based on the size of the rack 10 or based on the location of slots in the rack 10 for receiving the horizontal portions 68b, 69b of the forks 68, 69. An adjustment mechanism may be used to adjust the position of the forks 68, 69.

It will be appreciated that other end effectors other than the adjustable fixture 66 may be used.

Once the rack robot picks up a rack 10, the rack robot 52 can reorient the rack 10 by rotating and/or pivoting the base 60, the lower arm 62 and/or the upper arm 64. For example, as shown by comparing FIGS. 2 and 3, the rack robot 52 has reoriented the rack 10 by rotating the upper arm 64 about the transverse axis Y.

The line side robot 54 is generally configured to remove parts 20 from the rack 10. The line side robot 54 can be generally similar to the rack robot 52, and may include a base 70 similar to base 60, a lower arm 72 similar to lower arm 62, and an upper arm 74 similar to upper arm 64. The line side robot 54 may also include an end effector in the form of a picking element 76 coupled to a distal end of the upper arm 74 and configured for picking individual parts 20 from the rack (normally one at a time) to remove the parts 20 from the rack 10.

In some embodiments, the picking element 76 may be configured to unload parts 20 from the rack 10 by disengaging the part 20 from one or more of the clips 24. Specifically, the picking element 76 may move a retaining arm of the clip 24 from a locked position (in which the clip 24 holds the part 20), to an open position (so that the part 20 may be removed from the rack 10). This may be done by the picking element 76 grabbing the part 20 and moving the part 20 so to move the retaining arm of the clip 24 into the open position.

It will be appreciated that other end effectors other than the picking element 76 may be used.

During unloading of the racks 10, as described above, the loaded racks 10a enter the line feed device 50 at the input end 50a. The line feed device 50 then conveys the loaded rack 10a toward the rack robot 52 where the rack robot 52 picks up the rack 10a using the adjustable fixture 66 (e.g. the forks 68, 69). In some embodiments, the forks 68, 69 may need to be repositioned along the support bracket 67 in order to engage and pick up the rack 10.

Once the rack robot 52 has engaged the rack 10, the rack robot 52 may then reorient the rack 10 so as to position and orient a first part 20 in a removal locus. For example, the rack robot 52 may rotate the rack 10 about one or more axes and/or may move the rack 10 along one or more axes by pivoting the base 60, the lower arm 62, and/or the upper arm 64 so that the rack 10 is provided in a first orientation. In some embodiments, the base 60 of the rack robot 52 may move linearly along either the longitudinal axis X, or the transverse axis Y, so as to further facilitate reorientation or repositioning of the rack 10.

In some embodiments, once the rack 10 is in the first orientation, the line side robot 54 may then check to see if the part 20 is in the correct position for removal, for example by using a sensor (e.g. an image sensor, a proximity sensor, etc.). For example, the line side robot 54 may be unable to pick up the part 20 if the rack robot 52 has incorrectly positioned or oriented the rack 10. In some embodiments, the line side robot 54 may communicate with the rack robot 52 so as to correct the position and orientation of a part 20 by moving the rack 10. For example, the line side robot 54 may suggest adjustments to the position and orientation of the rack 10 so as to place the part 20 in the removal locus.

Communication and/or coordination between the line side robot 54 and the rack robot 52 may reduce the possibility of damaging to the part 20 during removal, and may reduce downtime in assembly line operations, as damaged parts or misplaced parts tend to stall the substantial portions of the manufacturing line. Also, communication and/or coordination between the line side robot 54 and the rack robot 52 may accommodate the loading/unloading of different types of parts and racks.

In some embodiments, the line side robot 54 may be configured to check to see if the correct parts 20 are loaded in the rack (i.e. the line side robot 54 may identify each part 20).

In some embodiments, the rack robot 52 may be configured to check if the correct rack 10 has been received for a given manufacturing line. In some embodiments, the rack robot 52 may perform this check by measuring the weight or size of the rack 10 as received from the feed device 50, by optical inspection, or via other techniques.

Once the part 20 is in the removal locus, the line side robot 54 may remove the part 20 from the rack 10. To remove the part 20, the line side robot 54 may position and orient the picking element 76 by pivoting the base 70, the lower arm 72, and/or the upper arm 74. Once in position, the picking element 76 grasps the part 20 and then removes the part 20 from the rack 10.

In some embodiments, the picking element 76 may be configured to disengage one or more clips 24 by moving a retaining arm of the clip from the locked position to the open position by moving the part 20 against the retaining arm of the clip 24. Once the clip 24 is disengaged, the line side robot 54 may remove a first part 20*a* from the rack 10, and then use the first part 20*a* in an assembly line. For example, if the first part 20*a* is a door panel for a car, the line side robot 54 may install the door panel on an automotive chassis. Alternatively, the line side robot 54 may pass the first part 20*a* to an operator for manual assembly.

After removing the first part 20*a* from the rack 10, the rack robot 52 may reorient the rack 10 to a second orientation so as to position and orient a second part 20*b* in the removal locus. The line side robot 54 then positions and orients the picking element 76 so as to remove the second part 20*b* from the rack 10.

Figure 6:
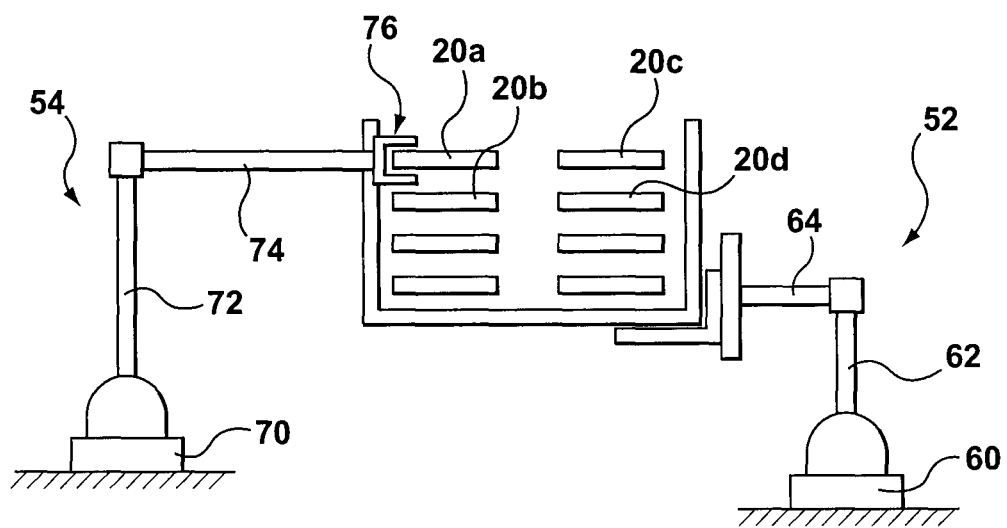
FIG. 6 is a side schematic view of a rack robot orienting a rack to facilitate a line side robot removing a first part from the rack.
Figure 7:
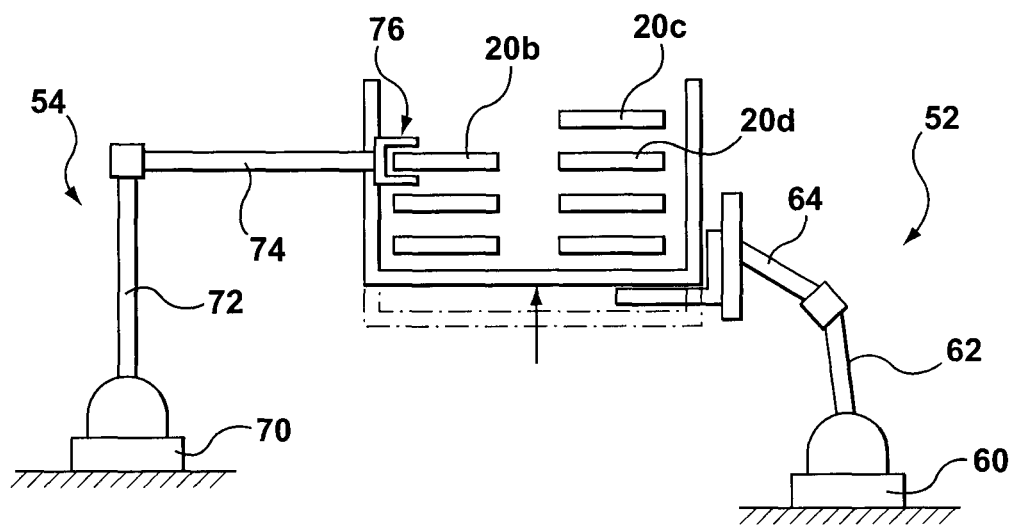
FIG. 7 is a side schematic view of the rack robot of FIG. 6 reorienting the rack to facilitate the line side robot removing a second part from the rack.

In various embodiments, the removal locus of the first part and the second part may be different, or they may be the same. For example, referring to FIGS. 6 and 7, the removal locus of the first part 20*a* and the second part 20*b* is the same. To keep the same removal locus, after the line side robot 54 removes the first part 20*a* from the rack 10, the rack robot 52 reorients the rack 10 such that the rack 10 is higher relative to the line side robot 54 and the second part 20*b* is in the same removal locus as the first part 20*a* was previously. Specifically, the lower arm 62 and the upper arm 64 of the rack robot 52 pivot relative to each other so as to raise the rack 10. Comparatively, the lower arm 72, the upper arm 74 and the picking element 76 of the line side robot 54 are the same for the first part 20*a* and the second part 20*b*.

In some embodiments, maintaining the same removal locus for each successive part may require the rack robot 52 to perform additional movements. For example, the upper arm 64 may need to rotate about its longitudinal axis X so as to rotate the rack or flip the rack 10 upside down.

In other embodiments, the removal locus for the first part 20*a* and the second part 20*b* may be different, and the rack robot 52 may be required to reorient the rack 10 (e.g. including inverting the rack 10 so it is upside down) and the line side robot 54 may need to reorient the picking element 76 so as to receive the second part 20*b*.

In this manner, the rack robot 52 and line side robot 54 may generally cooperate so that racks 10 with tightly packed parts 20 in different orientations may be used.

While the above description referred to unloading of parts 20 from racks 10, it will be appreciated that the parts 20 could be loaded into the racks 10 using similar techniques generally in reverse.

Figure 8:
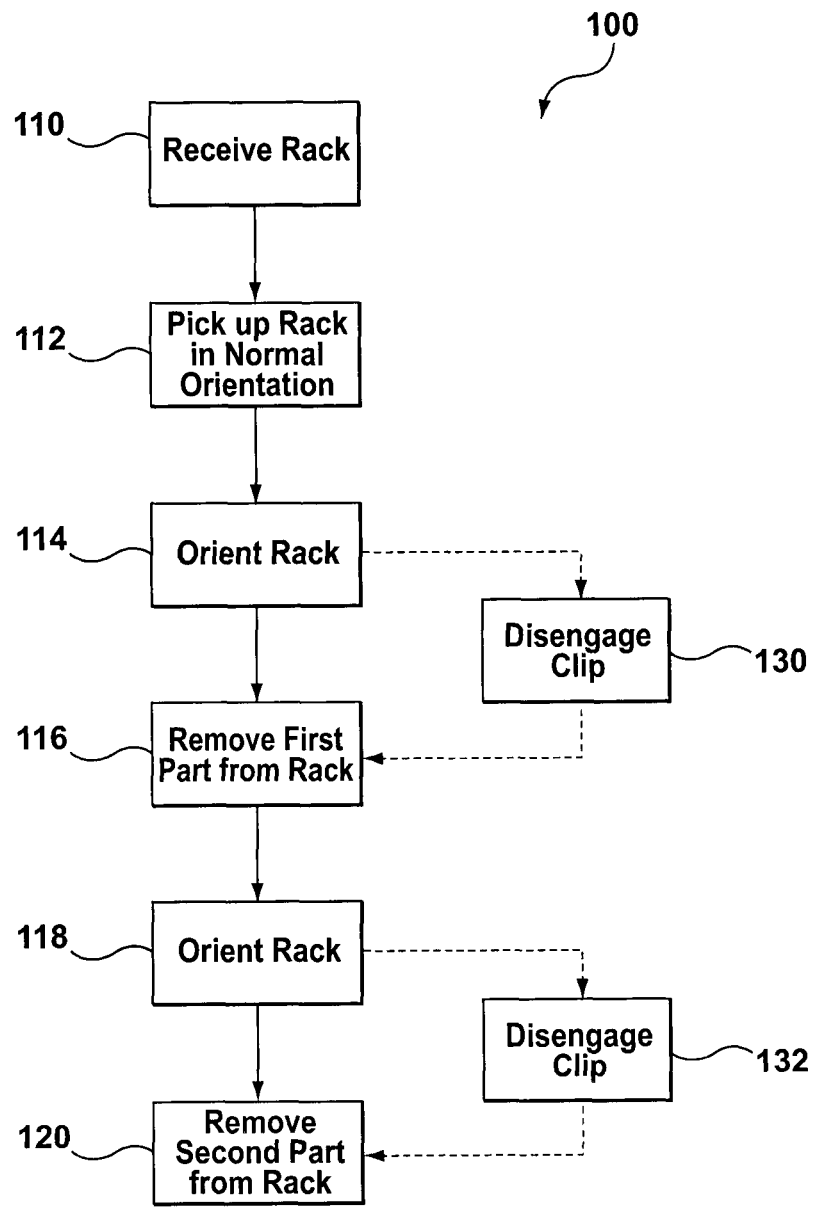
FIG. 8 is a flow chart illustrating a method of unloading parts from a rack.

Referring to FIG. 8, there is a flow chart illustrating a method 100 of unloading parts from a rack.

The method 100 begins at step 110 where a rack is received. The rack may be any rack holding one or more parts positioned and oriented within the rack. For example, the rack may be received from a conveyor, a truck, a transport device, or a feed device. The rack may be received in a variety of orientations utilized to maximize packing density.

At step 112, the rack is engaged and picked up in a normal orientation. The normal orientation may be generally defined so that the rack is positioned upright, and level. In some embodiments, the rack may be picked up using a rack robot as described above.

At step 114 the rack is oriented to a first orientation so that a first part may be removed from the rack. The first orientation is generally different from the normal orientation. For example, the first orientation may involve the rack rotated about one or more axes compared to the normal orientation, so that the first orientation is oblique relative to the normal orientation. Furthermore, the first orientation may reposition the rack by translating the rack along one or more axes.

At step 116 the first part is removed from the rack. For example, the part may be removed from the rack using a line side robot, manual labour, or another removal device or system.

If there is more than one part in the rack, the method 100 may proceed to step 118 where the rack is oriented to a second orientation so that a second part may be removed from the rack. The second orientation is generally different from the normal orientation, and may be different from the first orientation. For example, the second orientation may involve the rack rotated about one or more axes compared to the normal orientation, so that the second orientation is oblique relative to the normal orientation. Similarly, the second orientation may involve the rack rotated about one or more axes compared to the first orientation so that the second orientation is oblique relative to the first orientation.

At step 120 the second part is removed from the rack. For example, the part may be removed from the rack using a line side robot, manual labour, or another removal device or system.

Steps 118 and 120 of the method 100 may be repeated for each additional part held within the rack as desired.

In some embodiments, the first orientation defines a removal locus for removing the first part from the rack and the second orientation positions the second part in approximately the same removal locus so that the second part may be removed from the rack in substantially the same way as the first part. This can be useful when the part is removed using a line side robot as described above.

In some embodiments, each part may be held in the rack using a clip moveable between a locked position (in which the clip holds the part) and an open position (in which the part can be inserted or removed from the clip). In these embodiments, after orienting the rack at step 114 the method 100 may further include step 130, disengaging a clip so that the first part may be removed from the rack. Similarly, after reorienting the rack at step 118, the method 100 may further include step 132, disengaging a clip so that the second part may be removed from the rack.

In some embodiments, each part may be held by more than one clip. Accordingly, step 130 may involve disengaging each clip holding the first part, and step 132 may involve disengaging each clip holding the second part.

Implementing the teachings herein may lead to packing density increases for packing parts in racks/containers. For packaging racks/containers, an increase in density can be realized by use of "out of normal" orientations, which may allow variation to typically restrictive "Cartesian" packing methods. However, such packing complexities require an accommodating "flexible" unload/load system; suitable robot-to-robot coordination as taught herein may ensure that such variable parts and packaging racks/containers can be unloaded/loaded, and not restricted by conventional packing methods. This flexibility may allow acceptance of varying parts and/or multiple packaging racks/containers. Also, it should be understood that "out of normal" orientations may be applied to the parts within racks/containers and to the rack/containers themselves while being transported (in trucks, shipping containers, etc.). This may lead to greater packing density and freedom in the supply chain management.

Figure 9A:
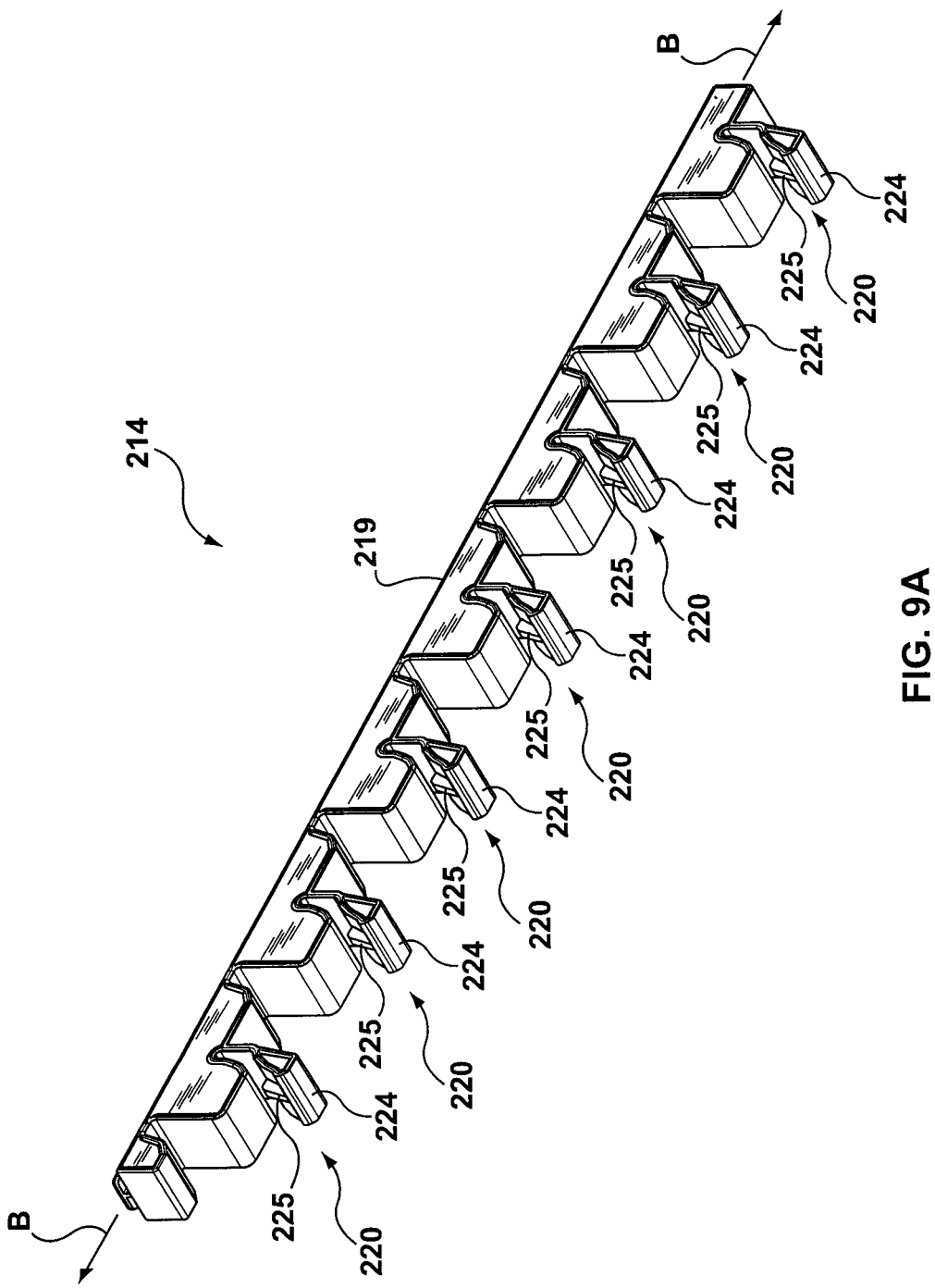
FIG. 9A is a perspective view of a dunnage strip.
Figure 9B:
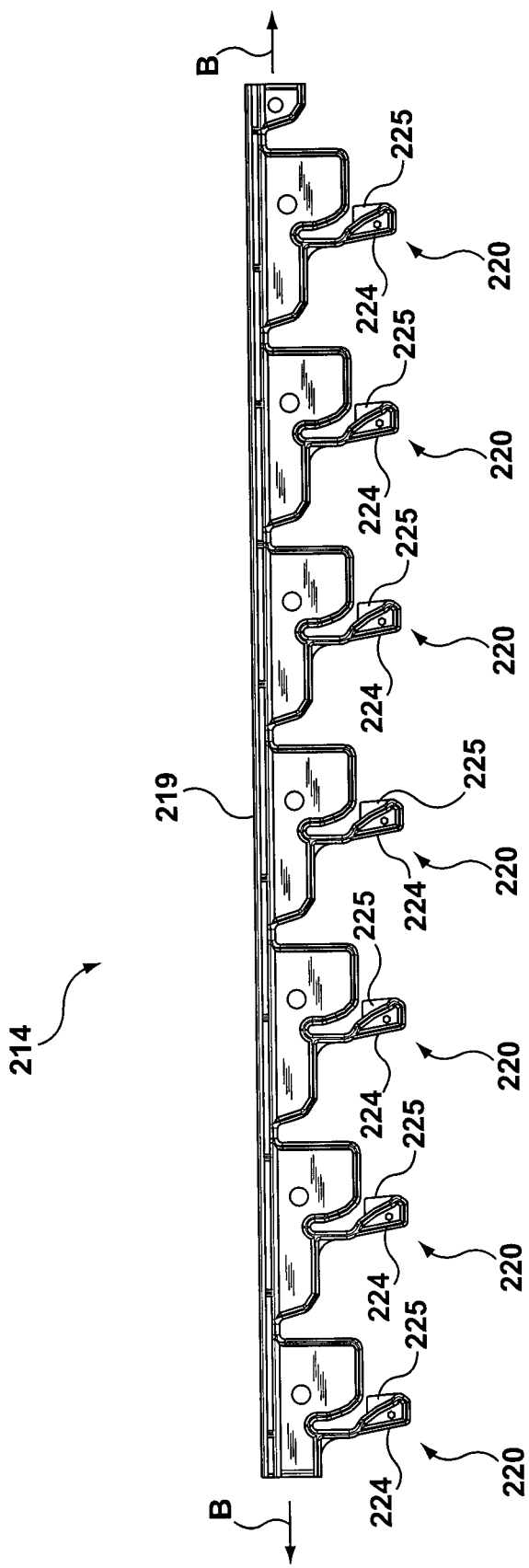
FIG. 9B is a side view of the dunnage strip of FIG. 9A.

Turning now to FIGS. 9A and 9B, an example of a dunnage strip is shown generally at 214. The dunnage strip 214 may be similar to the dunnage strips as generally described in PCT Patent Publication No. WO 2009/149544, filed on Jun. 11, 2009 and entitled APPARATUS, SYSTEMS AND METHODS FOR SECURING PARTS, the entire contents of which are hereby incorporated by reference.

As shown, the dunnage strip 214 is an elongate member that extends along a longitudinal axis B. The dunnage strip 214 includes an elongated base 219 and a series of clips 220 coupled to the elongated base 219. Each of the clips 220 can include a retaining arm 224 and a locking tab 225 configured to hold a flange 218 or another portion of a part 216, as shown for example in FIGS. 12 and 13. As described in greater detail below, the dunnage strip 214 is configured so that the dunnage strip 214 may be used to secure and retain parts 216 such that the parts 216 may hang below the dunnage strips 214.

Figure 10:
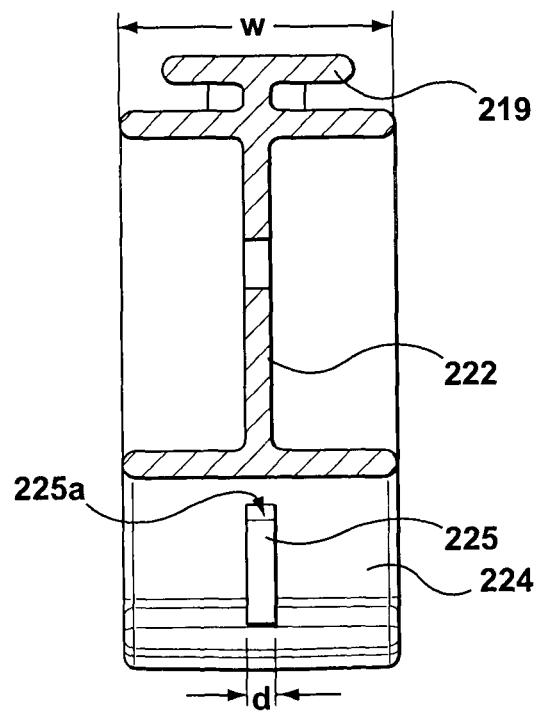
FIG. 10 is a cross sectional view of the dunnage strip of FIG. 11.
Figure 11:
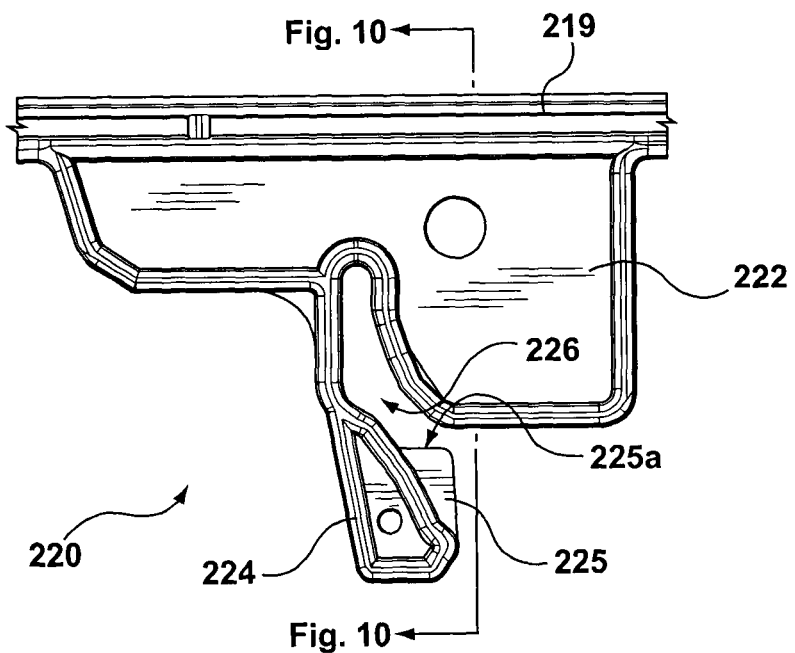
FIG. 11 is a close up side view of a clip of the dunnage strip of FIG. 9A.

Referring to FIGS. 10 and 11, each clip 220 comprises a body 222 coupled to the elongated base 219 of the dunnage strip 214, and a retaining arm 224 extending outwardly from the body 222 (generally downwards in this orientation). The body 222 may be removably attachable to the elongated base 219, or the body 222 may be permanently affixed to, or integral with, the elongated base 219.

Figure 13:
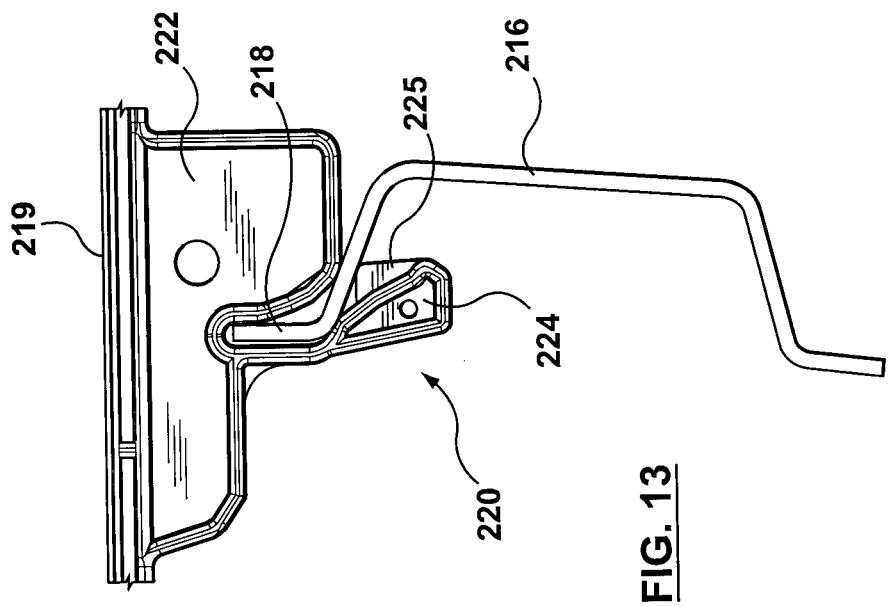
FIG. 13 is a side view of a part being inserted into the clip of FIG. 11, wherein the clip is in a locked position.
Figure 12:
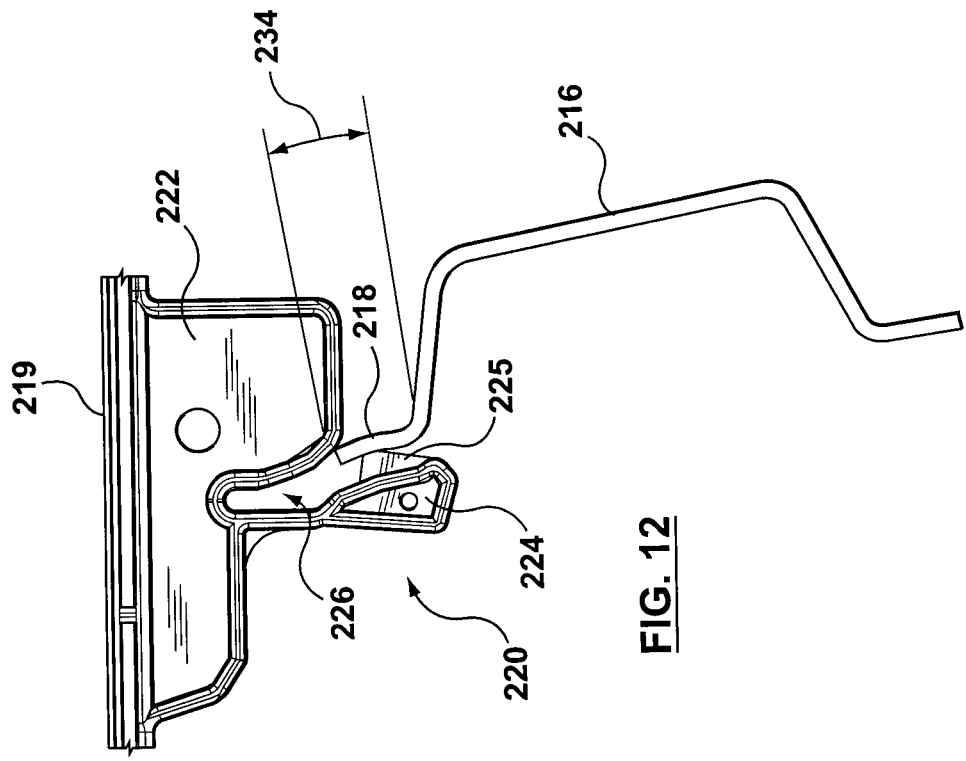
FIG. 12 is a side view of a part being inserted into the clip of FIG. 11, wherein the clip is in an open position.

The body 222 has a groove 226 therein for receiving a portion of the part 216, for example the flange 218 of the part 216 (see FIGS. 12 and 13). The groove 26 may extend transversely through the entire width w of the body 222. Alternatively, the groove 226 may extend only partially through the width w of the body 22, or through the width of the body 222 at an acute or obtuse angle to the longitudinal axis B.

Generally, the groove 226 is complementarily shaped to correspond with the shape of the flange 218 or another portion of the part 216. For example, the groove 226 may have a depth corresponding to the length 234 of the flange 218.

The retaining arm 224 extends outwardly from the body 222 generally along the groove 226. The retaining arm 224 may be integrally formed with the body 222 or may be a separate piece. The retaining arm 224 can be formed of a generally resilient material.

The retaining arm 224 is generally moveable between a locked position and an open position. For example, FIG. 12 shows the part 216 being inserted into the clip 220 with the retaining arm 224 in the open position, while FIG. 13 shows the retaining arm 224 in the locked position after inserting the flange 218 into the groove 226.

In some embodiments, the retaining arm 224 is biased towards the locked position. For example, a resilient portion of the retaining arm 224 can bias the retaining arm 24 toward the locked position. While an entity (e.g. a human user, a robot, etc.) may apply sufficient force to move the retaining arm 224 to the open position (e.g. when inserting a part 216 into the clip 220), when the force is removed the retaining arm 224 will return to the locked position, thus securing the part 216 to the clip 220.

As shown in FIG. 13, when the clip 220 is in the locked position, the clip 220 is configured to hold or secure the flange 218 or another portion of the part 216 in the groove 226 thus securing the part 216 to the clip 220, with the part 216 hanging below the clip 220.

As shown, with reference to FIGS. 10 to 13, the clip 220 may also include at least one locking tab 225 or "nose". For example, as shown a single locking tab 225 protrudes outwardly from the retaining arm 224, generally in the middle of the retaining arm 224, and further overhangs the groove 226. In other embodiments, two or more locking tabs 625 may be provided, and may located at various locations on the engaging surface of the retaining arm 224 (e.g. with one locking tab 225 adjacent each of the opposite edges of the retaining arm 224, etc.).

The locking tab 225 may assist in securing the flange 218 or another portion of the part 216 within the groove 226. In particular, the locking tab 225 may further increase the contact pressure between the retaining arm 224 and the part and acting as a strengthening and/or stabilizing feature. This may be especially useful for example when the part 216 is suspended or hanging below the clip 220 (for example, as shown in FIGS. 9A to 11, the dunnage strip 214 is oriented so that the retaining arm 224 is below the groove 226). The locking tab 225 may retain the flange 218 within the groove 226 when the part 216 is suspended, hanging below the clip 220.

Referring particularly to FIG. 10, the locking tab 225 may be a relatively narrow member with a width d generally substantially less that the width w of the dunnage strip 214 such that the locking tab 225 generally does not substantially interfere with the loading or unloading of the part 216.

In some embodiments, the width d of the locking tab is less than 2 centimeters. In some embodiments, the width d of the locking tab is less than 1 centimeter. In some embodiments, the width d of the locking tab is less than 0.5 centimeters. In some embodiments, the width d of the locking tab is about 0.4 centimeters.

As shown, the locking tab 225 may include a generally flattened supporting region 225*a*, such that the part 216 may be securely restrained by the retaining arm 224 (as best shown in FIG. 13). In this manner, the parts 216 can be suspended or "hung" from the dunnage strip 214 with the locking tab 225 engaged against the flange 218 or another portion of the part 216 in a secure manner.

In some embodiments, the dunnage strip 214 is configured to securely hold the parts 216 within the clip 220 in a fixed orientation. Thus, it generally becomes easier for a robot (e.g. the line side robot 54) to locate each part 216 and to grab each part 216. In particular, the action of gravity against the parts 216 handing from the dunnage strips 214 tends to align the parts 216. Thus, automatic loading and unloading of the parts 216 may become easier.

All or a portion of the clip 220 may be made from any suitable material, such as polycarbonate, rubber, acrylonitrile butadiene styrene (ABS), xenoy (e.g. Xenoy® Resin 5720 (polycarbonate and polybutelyne terephthalate)), wood, metals, or plastics including thermoplastics and thermosets.

Figure 14:
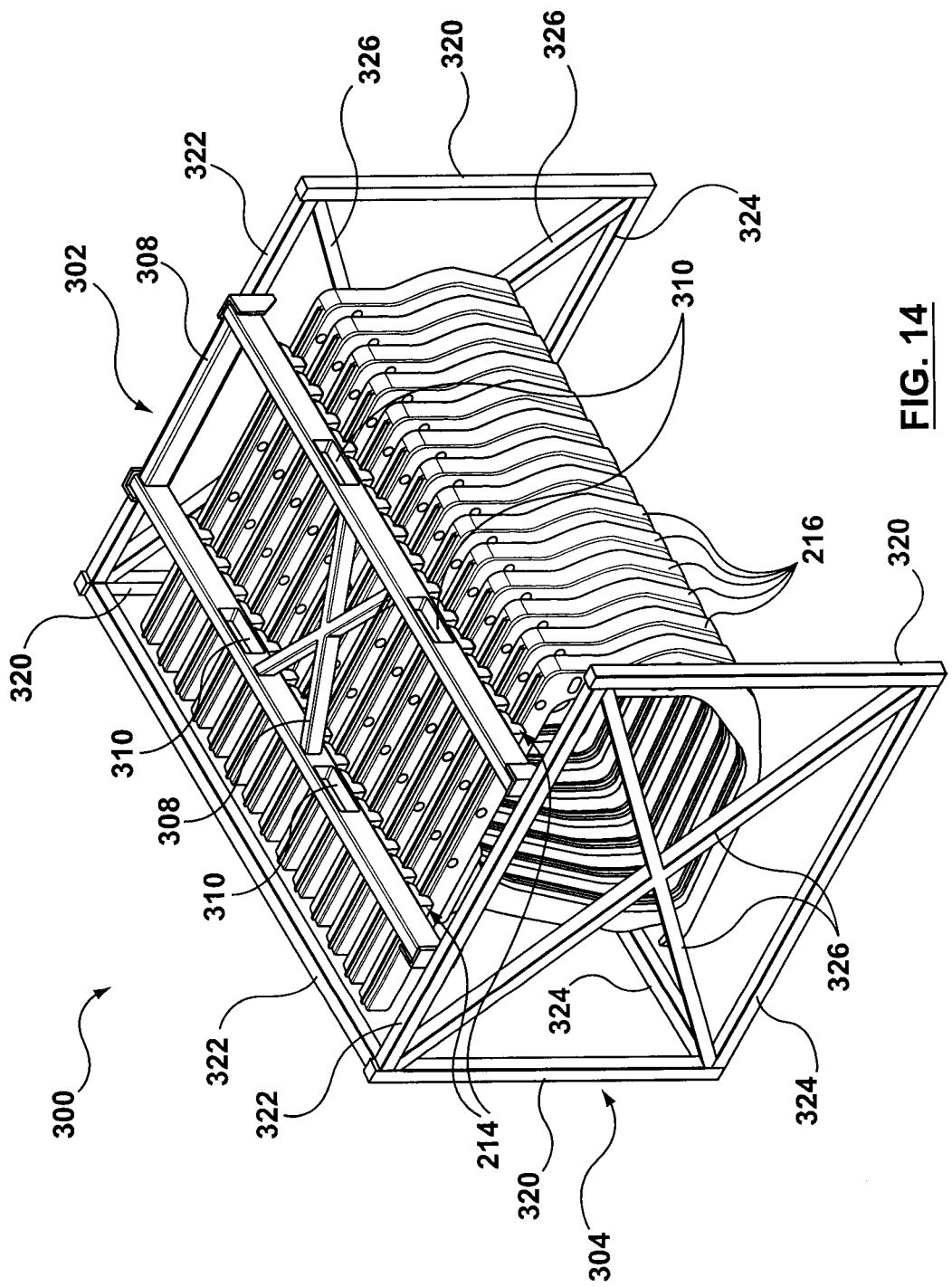
FIG. 14 is a perspective view of a rack assembly supported by a lower rack body.

Turning now to FIG. 14, an example of a rack assembly is shown generally at 300. The rack assembly 300 includes a removable rail assembly 302 and a lower rack body 304.

The rail assembly 302 as shown includes a pair of elongate rails 306 secured together by one or more cross members 308. As shown, the rails 306 may be parallel. The rails 306 may also include a plurality of apertures 310 therein. The apertures 310 allow the rails 306 to be engaged by the forks of a fork-lift or another device (e.g. the rack robot 52) so that the rail assembly 302 can be manipulated.

Figure 15:
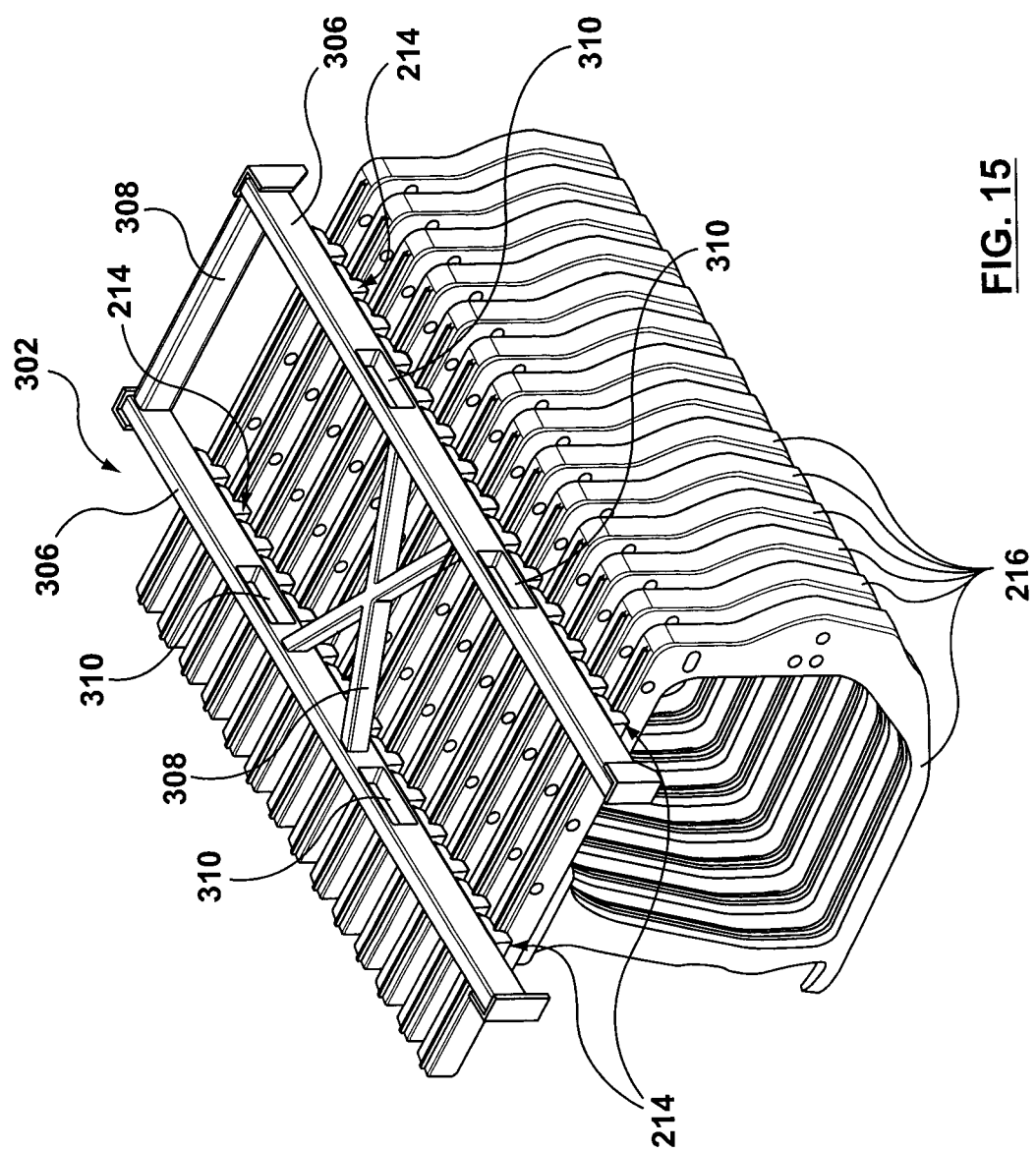
FIG. 15 is a perspective view of the rail assembly of FIG. 14 removed from the lower rack body.

Coupled to the underside of each rail 306 are a plurality of locking clips for securing parts to the rail assembly 302. For example, as shown in FIGS. 14 and 15, each rail 306 can include a dunnage strip 214 affixed thereto for hanging a plurality of parts 216 therefrom. For example, and as shown in FIG. 10, the elongated body 219 of the dunnage strip 214 may be generally T-shaped and may be received in a slotted channel (not shown) on each rail 306.

As shown in FIG. 14, the lower rack body 304 generally includes a plurality of vertical members 320, upper cross members 322 and lower cross members 324 secured to the vertical members 320 to define a frame, and the lower rack body 304 may also include bracing members 326. The lower rack body 304 may be used to support the rail assembly 302 (e.g. with the rails 306 resting on the upper cross members 322), for example when the rail assembly 302 is being loaded or unloaded by an operator.

However, as shown in FIG. 15, the rail assembly 302 is generally not permanently coupled to the lower rack body 304, but rather may be removed from the rack body 304. Thus, the parts 216 can be protected by the lower rack body 304 when desired, but the lower rack body 304 may be removed when no longer desired. For example, the rail assembly 302 may be used to present parts 216 for loading and/or unloading without the lower rack body 304 interfering with the loading and/or unloading process. Accordingly, loading and/or unloading of parts 216 from the rail assembly 302 may be easier as there are fewer obstructions.

The rail assembly 302 may also be used for transportation of parts 216 without the need to transport the lower rack body 304. This may be desirable as it may reduce undesired weight during transportation, tend to reduce redundant costs for packaging, and reduce shipment of empty racks. This may also increase the volume available for packing parts 216.

Figure 16:
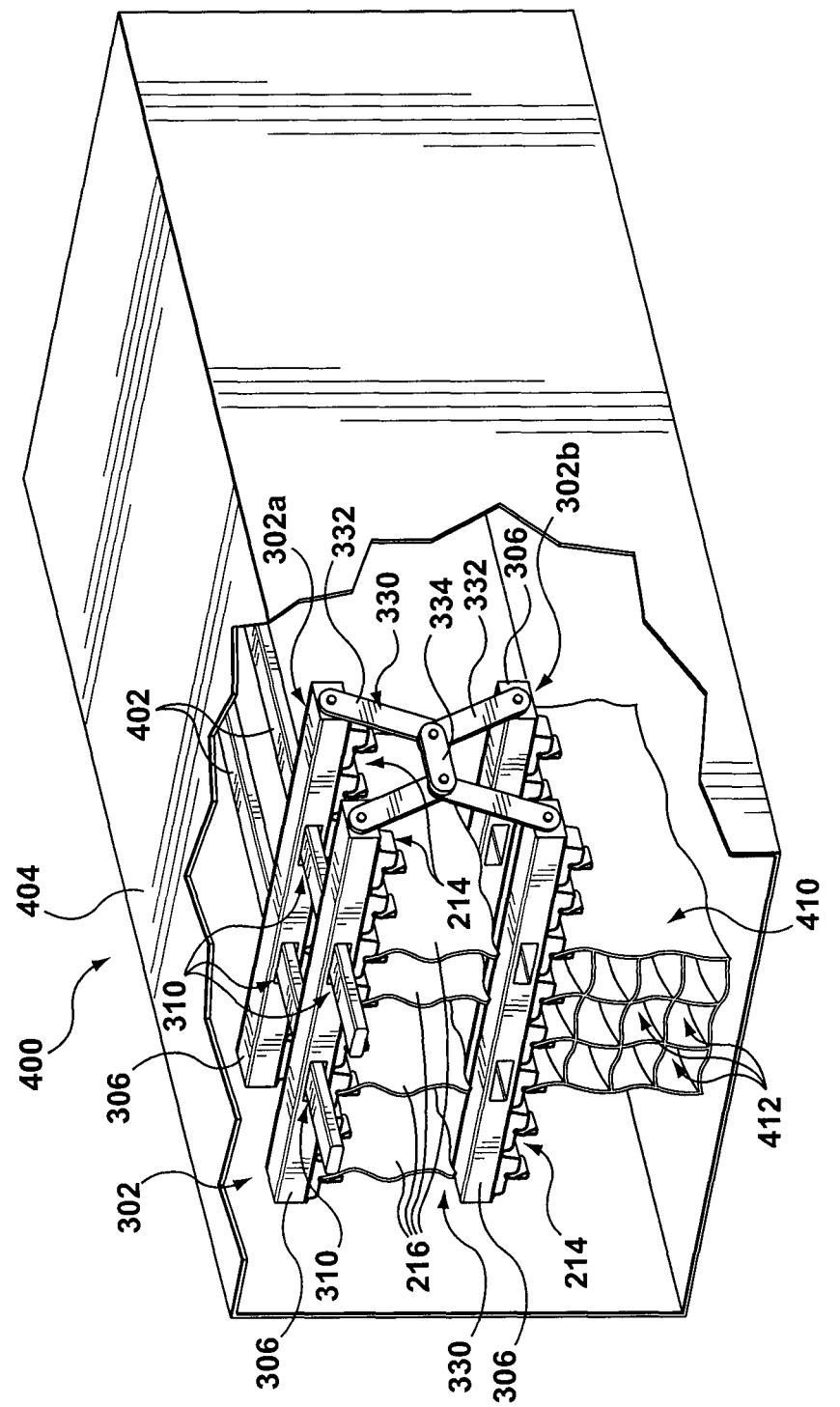
FIG. 16 is a perspective view of rail assemblies within a transportation container.

For example, as shown in FIG. 16 the rail assemblies 302 may be loaded into a transportation container 400 (e.g. a shipping container or a truck container) configured to securely receive the rail assemblies. As shown, the container 400 may include a pair of beams 402 secured to the ceiling 404 of the container 400. The beams 402 are configured to engage the apertures 310 in the rails 306 so as to secure the rail assembly 302 to the container. In this manner, the rail assembly 302 can be loaded into the container 400 without the use of the lower rack body 304, with the parts 216 suspended from the dunnage strips 214 on the rails 306.

In some embodiments, the rail assembly 302 may be coupled to or may include one or more scissoring devices 330 that allow a plurality of rail assemblies 302 to be stacked vertically. For example, as shown the scissoring device 330 may include a plurality of link members 332 and a cross member 334 that allow the upper rail assembly 302a to support a lower rail assembly 302b.

In some embodiments, the scissoring device 330 may be spring loaded such that as parts 216 are loaded onto the lower rail assembly 302a, the scissoring device 330 lowers the lower rail assembly 302b away from the upper rail assembly 302a. The scissoring device 330 may be configured such that when the lower rail assembly 302b has a desired quantity of parts, the lower rail assembly 302b is sufficiently far away from the upper rail assembly 302a such that parts 216 may be loaded onto the upper rail assembly 302a.

Conversely, when the parts 216 are removed from the lower rail assembly 302b, the scissoring device 330 may contract, moving the rail assemblies 302a, 302b close together. This can reduce the volume occupied by the upper and lower rail assemblies 302a, 302b.

In some embodiments, the dunnage strips 214 may be used to support carrying devices 410 such as flexible bags made of cloth, flexible plastic or other material and which may have a plurality of compartments 412. Each compartment 412 may be of a similar size or may be differently sized. The compartments 412 may allow a variety of parts to be transported using the dunnage strip 214, particularly smaller parts or parts that may not have flanges for engaging the clips 220 and which can be stored in the various compartments 412.

Figure 18:
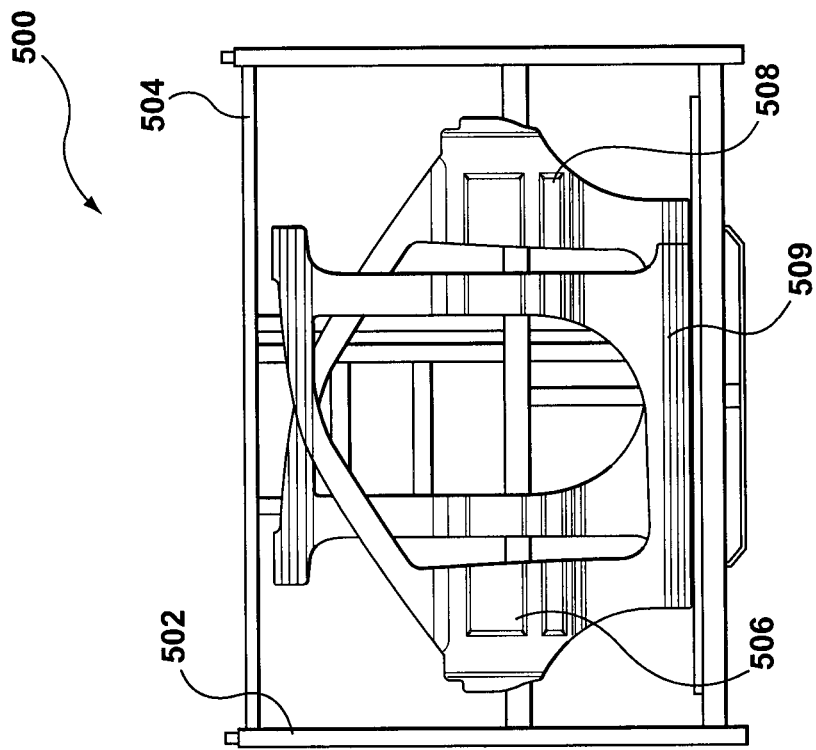
FIG. 18 is an end view of the rack of FIG. 17.
Figure 17:
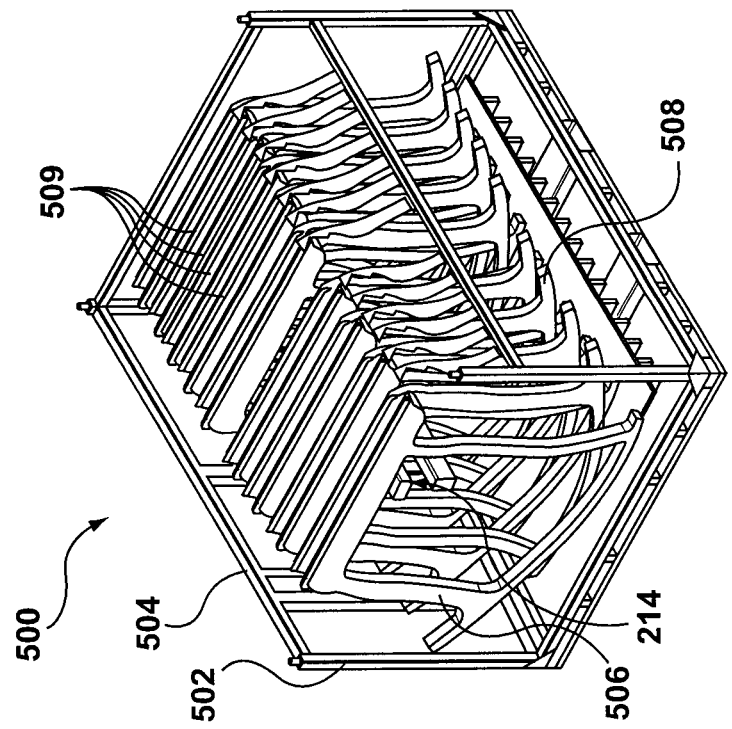
FIG. 17 is a perspective view of a rack having a plurality of left-hand parts and right-hand parts.
Figure 19:
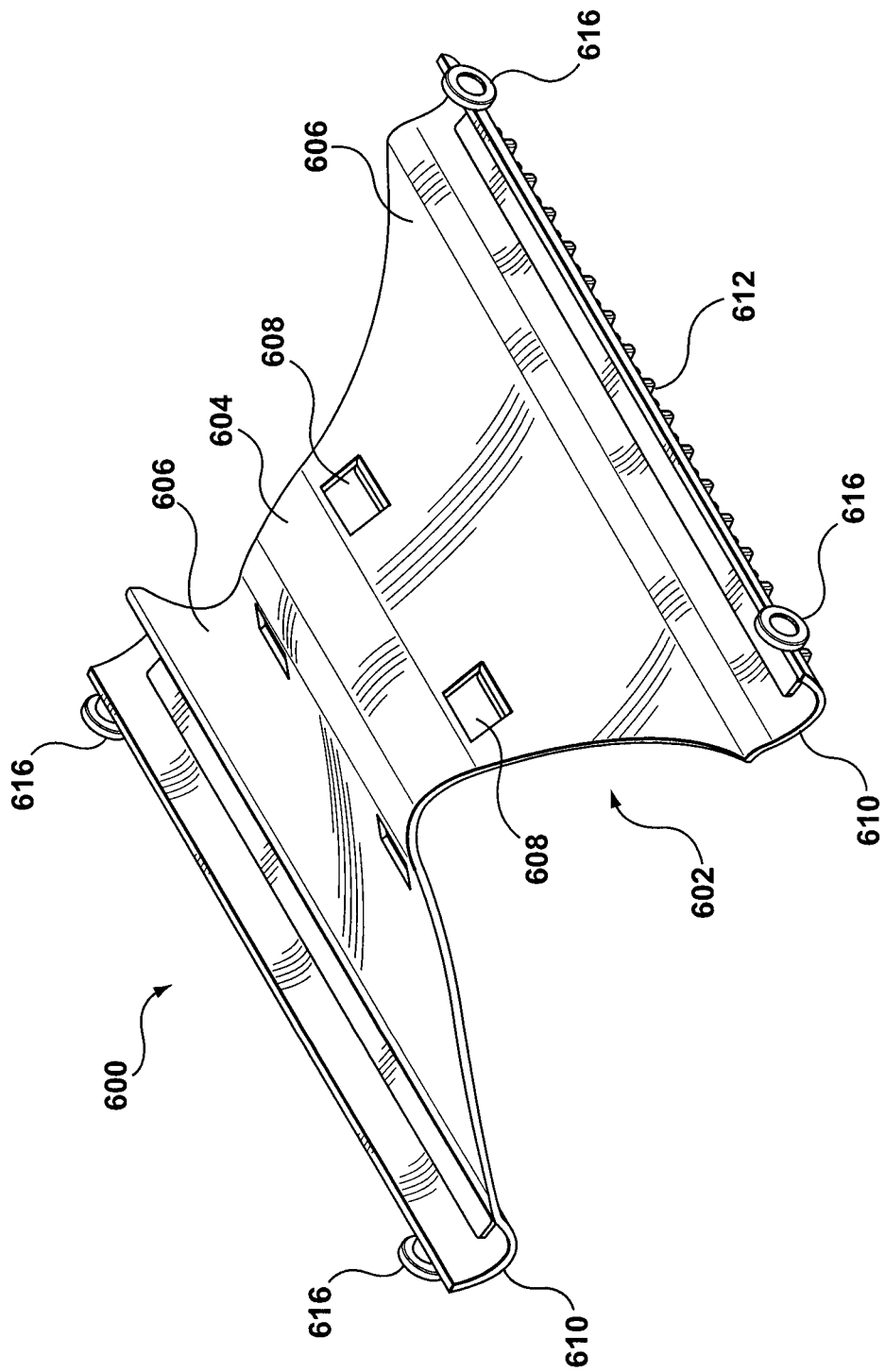
FIG. 19 is a top perspective view of a transportation device.
Figure 20:
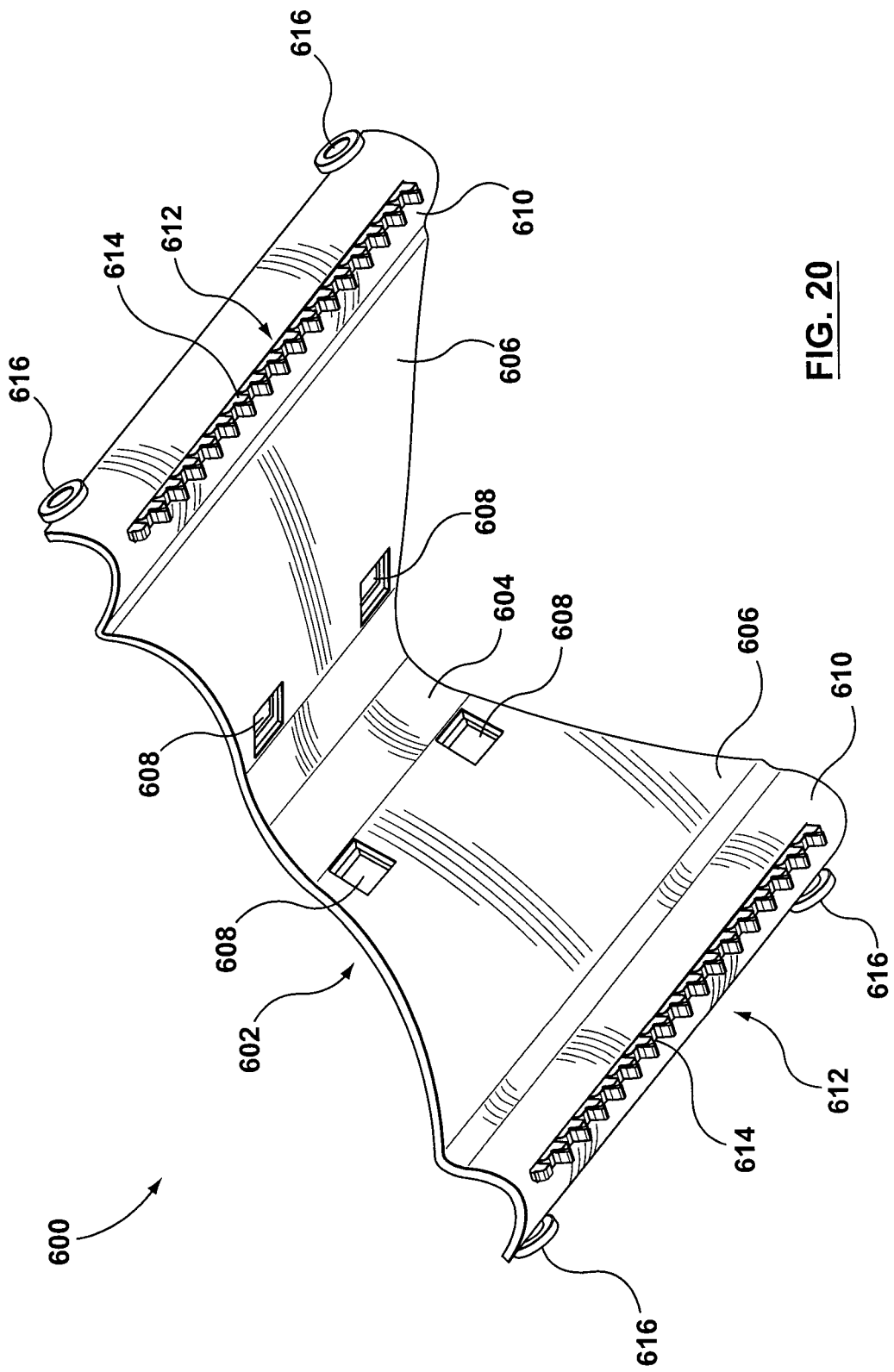
FIG. 20 is a bottom perspective view of the device of FIG. 19.
Figure 21:
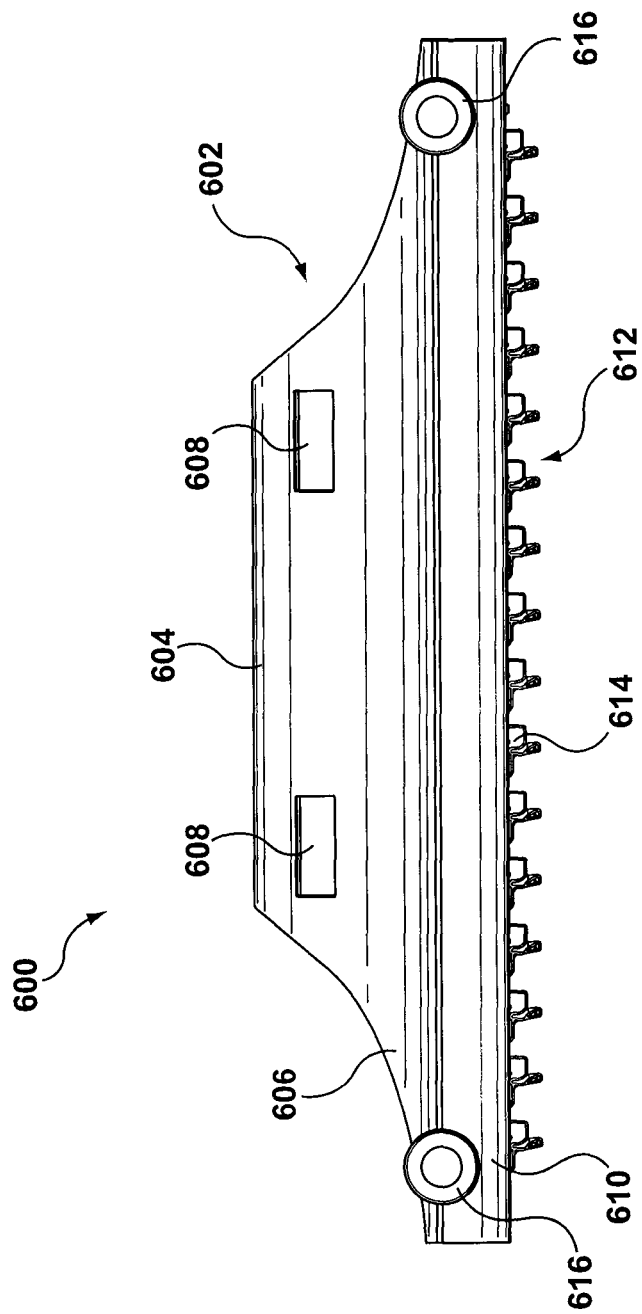
FIG. 21 is a side view of the device of FIG. 19.

Turning now to FIGS. 17 and 18, an example of another rack is shown generally at 500. This rack 500 includes vertical frame members 502 and horizontal frame members 504 coupled thereto to define a frame. Coupled to the frame are one or more dunnage strips (e.g. dunnage strips 214) that are configured to receive both left-hand parts 506 and right-hand parts 508. For example, most cars and other vehicles require both left-hand components (e.g. door rings) for the left side of the car and corresponding right-hand components for the right side of the car. As the dunnage strips 214 generally allow parts of different configurations to be secured in the same rack, it is therefore possible to provide the rack 500 with both left-hand parts 506 and right-hand parts 508. This can ensure that an equal number of left-hand and right-hand parts are available for both sides of a vehicle during manufacturing.

In some embodiments, for example as shown in FIG. 17, both the left-hand parts 506 and right-hand parts 508 may be inverted from their installed orientation such that the dunnage strips engage a common feature (shown here as a rail portion 509). In such embodiments, it may be desirable to use the loading and unloading system described above (with the rack robot 52 and line side robot 54) to present the parts to an operator in the proper orientation.

In other embodiments, the left-hand parts 506 and right-hand parts 508 may be provided generally in their installed orientation within the rack, as shown in FIG. 18.

Turning now to FIGS. 19 to 22, an example of a transportation device for transporting parts (e.g. parts 216) is shown generally at 600. The device 600 includes a main body portion 602 generally having an inner region 604 and outer regions 606. The inner region 604 may be generally positioned above the outer regions 606, and may be narrower than the outer regions 606 such that the main body portion 602 has a generally winged shape. As shown, the inner region 604 may be curved.

Provided generally between the inner region 604 and the outer regions 606 are apertures 608. The apertures 608 may be used to generally grab the main body region 602 so as to pick up and/or move the main body region 602.

As shown in FIG. 22, coupled to the outer regions 606 are curved portions 610. Coupled to the lower surface of the curved portions 610 are a plurality of clips indicated generally as 612. The clips 612 may be provided in a dunnage strip 614 (which may be similar to dunnage strip 214 generally described above).

In some embodiments, the device 600 may also include a plurality of wheels or rollers 616. The wheels or rollers 616 may be configured to engage with guide rails, for example in a transportation container (e.g. a shipping container or truck) so that the device 600 can be received and supported within the transportation container.

The main body portion 602 generally may be made of a single member, and may be made for example of plastic, metal, cardboard or any other suitable material. In some embodiments, the dunnage strips 614 may be configured to be press fit into the main body portion 602 (e.g. into grooves on the curved portions 610).

What has been described is merely illustrative of the application of the principles of the embodiments. Other arrangements and methods can be implemented by those skilled in the art without departing from the spirit and scope of the embodiments described herein.

I claim:

1. A method of unloading parts, comprising:
   a) providing a rack having at least a first part held in a first position within the rack and a second part held in a second position within the rack;
   b) picking up the rack;
   c) moving the rack to a first orientation so that the first part is in a removal locus;
   d) removing the first part from the rack;
   e) after step (d), moving the rack to a second orientation so that the second part is in the removal locus; and
   f) after step (e), removing the second part from the rack;
   wherein steps (b) and (c) are carried out using at least one rack robot;
   wherein step (d) is carried out using at least one line side robot; and
   wherein a plurality of clips are coupled to the rack, each of the clips moveable between a locked position in which the clip can securely hold a part, and an open position in which a part can be inserted or removed from the clip, each of the first and second parts being held by at least one of the clips, and, in step (d), the line side robot moves the at least one clip holding the first part to the open position.

2. The method of claim 1, wherein step (a) comprises receiving the rack conveyed by a line feed device.

3. The method of claim 2, wherein, prior to step (b), the line feed device presents the rack in a normal orientation.

4. The method of claim 3, wherein, after removing the first and second parts, the rack is conveyed away by the line feed device.

5. The method of claim 1, wherein, in removing the second part from the rack, the line side robot moves the at least one clip holding the second part to the open position.

6. The method of claim 1, further comprising, prior to step (d), sensing position and orientation of the first part.

7. The method of claim 6, further comprising communicating with the rack robot so as to correct the position and orientation of the first part by moving the rack.

* * * * *